US010497256B1

(12) United States Patent
Mubarek

(10) Patent No.: US 10,497,256 B1
(45) Date of Patent: Dec. 3, 2019

(54) METHOD, APPARATUS, AND SYSTEM FOR AUTOMATIC EVALUATION OF ROAD CLOSURE REPORTS

(71) Applicant: HERE GLOBAL B.V., Eindhoven (NL)

(72) Inventor: Omer Mubarek, Chicago, IL (US)

(73) Assignee: HERE Global B.V., Eindhoven (NL)

( * ) Notice: Subject to any disclaimer, the term of this patent is extended or adjusted under 35 U.S.C. 154(b) by 0 days.

(21) Appl. No.: 16/046,562

(22) Filed: Jul. 26, 2018

(51) Int. Cl.
*G08G 1/01* (2006.01)

(52) U.S. Cl.
CPC .................. *G08G 1/0133* (2013.01)

(58) Field of Classification Search
None
See application file for complete search history.

(56) References Cited

U.S. PATENT DOCUMENTS

| | | | | |
|---|---|---|---|---|
| 6,813,556 | B2* | 11/2004 | Watanabe | G08G 1/096844 340/905 |
| 7,623,963 | B2 | 11/2009 | Nomura | |
| 7,835,859 | B2* | 11/2010 | Bill | G01C 21/3679 340/905 |
| 8,392,112 | B2* | 3/2013 | Bradburn | G01C 21/3415 340/995.12 |
| 8,498,778 | B2* | 7/2013 | Seymour | B60Q 1/346 211/175 |
| 8,606,511 | B2* | 12/2013 | Johnson | G01C 21/3461 340/988 |
| 8,699,754 | B2* | 4/2014 | Zhang | G06K 9/00798 348/116 |
| 8,731,808 | B2 | 5/2014 | Tashiro et al. | |
| 8,760,314 | B2* | 6/2014 | Ramachandran | G08G 1/0112 340/905 |
| 8,818,708 | B2* | 8/2014 | Mathieu | G01C 21/365 701/400 |

(Continued)

FOREIGN PATENT DOCUMENTS

WO  2017009466 A1  1/2017

OTHER PUBLICATIONS

Wang et al., "Road Traffic Anomaly Detection via Collaborative Path Inference From Gps Snippets", Article, Sensors (Basel)17(3), published Mar. 9, 2017, pp. 1-21.

(Continued)

*Primary Examiner* — John F Mortell
(74) *Attorney, Agent, or Firm* — Ditthavong & Steiner, P.C.

(57) ABSTRACT

An approach is provided for automatically evaluating a road closure report (e.g., to reject or confirm the report). The approach, for example, involves processing the road closure report to determine one or more road links that are associated with a road closure. The approach also involves constructing a closure link graph comprising the road links, upstream road links, and downstream road links relative. The upstream and downstream road links are open for travel. The approach further involves retrieving probe data collected from vehicles traveling on roadways corresponding to the closure link graph. The approach further involves processing the probe data to calculate vehicle paths traversing the closure link graph. The approach then involves classifying a closure status of the road links based on the vehicle paths.

20 Claims, 21 Drawing Sheets

(56) References Cited

U.S. PATENT DOCUMENTS

| | | | |
|---|---|---|---|
| 9,104,729 B2* | 8/2015 | Dong | G06F 16/24547 |
| 9,140,566 B1* | 9/2015 | Curtis | G06Q 30/0282 |
| 9,368,030 B2* | 6/2016 | Hainzlmaier | G08G 1/096811 |
| 9,401,086 B2* | 7/2016 | Basalamah | G08G 1/0112 |
| 9,676,386 B2* | 6/2017 | Remillard | B60W 30/14 |
| 9,761,137 B2* | 9/2017 | Beaurepaire | G08G 1/096805 |
| 9,818,295 B2* | 11/2017 | Kesting | G01C 21/32 |
| 9,888,394 B2* | 2/2018 | Rajendran | H04W 24/02 |
| 9,928,743 B2* | 3/2018 | Eilertsen | G08G 1/0133 |
| 9,989,368 B2* | 6/2018 | True | G01C 21/32 |
| 10,003,924 B2* | 6/2018 | Krasnikov | G06N 3/0445 |
| 10,192,432 B2* | 1/2019 | Lorkowski | G01C 21/32 |
| 2005/0043884 A1* | 2/2005 | Atarashi | G01C 21/3415 701/533 |
| 2006/0173618 A1* | 8/2006 | Eyer | G01C 21/3484 701/469 |
| 2008/0312816 A1* | 12/2008 | Beier | G01C 21/26 701/532 |
| 2009/0143964 A1* | 6/2009 | Navone | G08G 1/096827 701/117 |
| 2009/0222198 A1* | 9/2009 | Raynaud | G01C 21/3461 701/532 |
| 2009/0281850 A1* | 11/2009 | Bruce | G01C 21/3438 705/80 |
| 2013/0332057 A1* | 12/2013 | Moore | G08G 1/0962 701/118 |
| 2014/0278055 A1 | 9/2014 | Wang et al. | |
| 2015/0032366 A1* | 1/2015 | Man | H04W 4/046 701/412 |
| 2016/0109254 A1* | 4/2016 | Rozman | G01C 21/3626 701/468 |
| 2016/0358468 A1* | 12/2016 | McGavran | G01C 21/3608 |
| 2017/0138752 A1* | 5/2017 | Mermelstein | G08G 1/167 |
| 2018/0049001 A1* | 2/2018 | Volozh | G06N 3/0445 |
| 2018/0136003 A1* | 5/2018 | Perkins | G01C 21/3685 |
| 2018/0267537 A1* | 9/2018 | Kroop | B60W 10/06 |
| 2018/0376305 A1* | 12/2018 | Ramalho de Oliveira | H04W 4/44 |
| 2019/0156667 A1* | 5/2019 | Arshad | G06K 9/00791 |

OTHER PUBLICATIONS

Stanojevic et al., "Mapfuse: Road Network Fusion for Incremental Map Updates", Feb. 7, 2018, 19 pages.

* cited by examiner

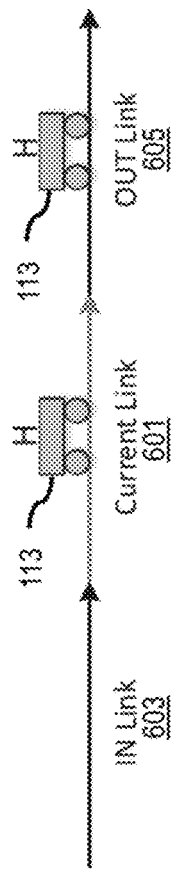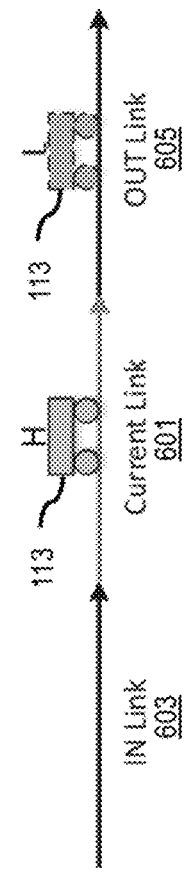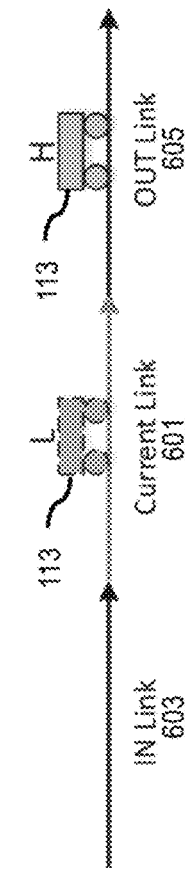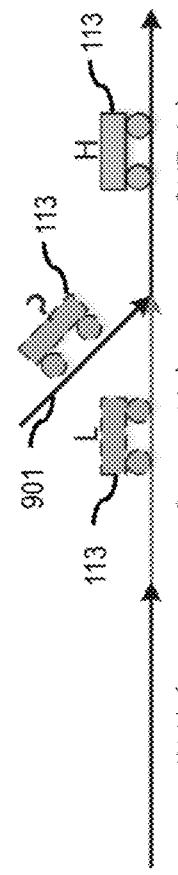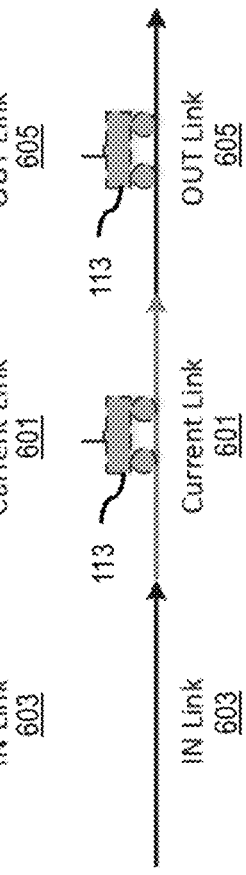
FIG. 9A
FIG. 9B
FIG. 9C
FIG. 9D
FIG. 9E

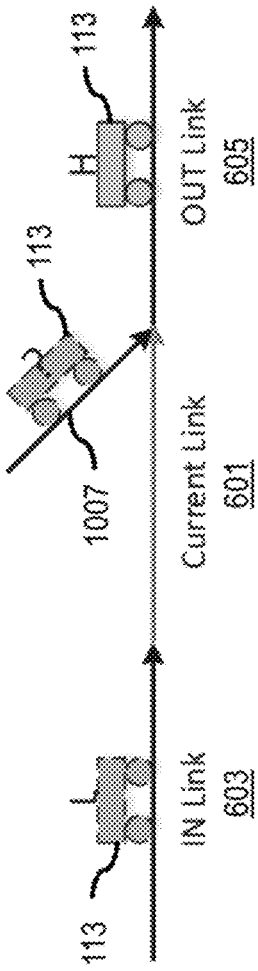
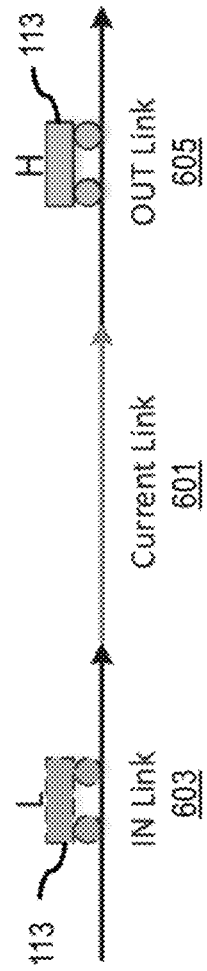
FIG. 10E
FIG. 10F

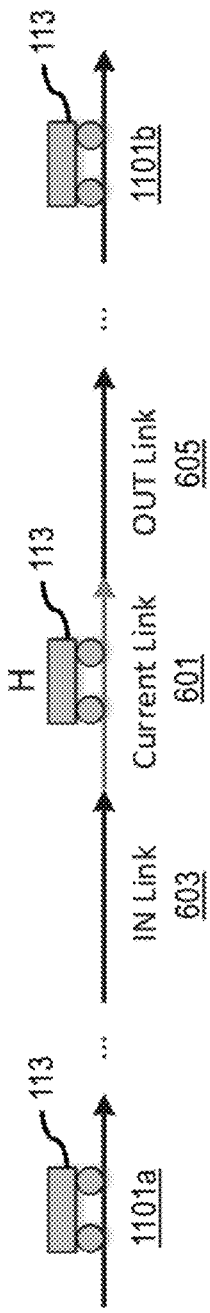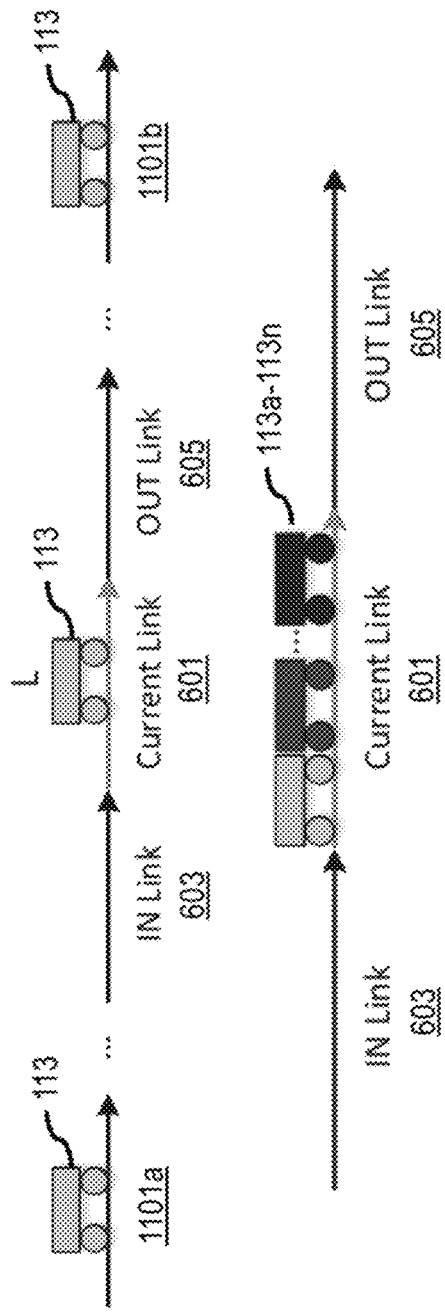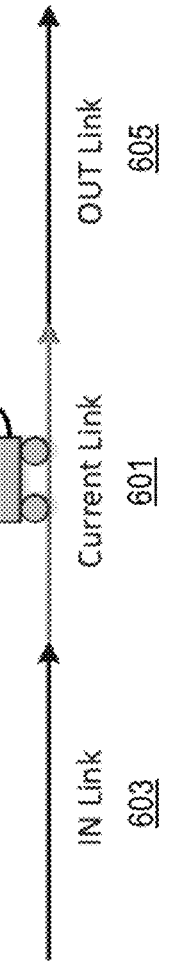
FIG. 11A
FIG. 11B
FIG. 11C
FIG. 11D

METHOD, APPARATUS, AND SYSTEM FOR AUTOMATIC EVALUATION OF ROAD CLOSURE REPORTS

BACKGROUND

Providing data on traffic incidents (e.g., abnormalities in traffic that can affect traffic flow such as accidents, lane closures, road closures, etc.) is an important function for map service providers. In particular, while most traffic incidents can have at least some negative impact on traffic, road closures can be the most severe because no cars can go through the affected roadway. The lack of knowledge about a road closure can have enormous negative impact on trip planning, routing, and estimated time of arrival. Therefore, traffic service providers face significant technical challenge to reporting road closures accurately, particularly when road closures are reported from third parties such as government/municipality agencies, local police, crowd-sourced data, and/or any other official/semi-official sources.

SOME EXAMPLE EMBODIMENTS

Therefore, there is a need for automatically evaluating the accuracy or reliability of a road closure report.

According to one embodiment, a computer-implemented method comprises processing the road closure report to determine one or more road links that are associated with a road closure. The method also comprises constructing a closure link graph comprising the one or more road links, one or more upstream road links relative to the one or more road links, and one or more downstream road links relative to the one or more road links. The one or more upstream road links and the one or more downstream road links are open for travel. The method further comprises retrieving probe data collected from one or more vehicles traveling on a plurality of roadways corresponding to the closure link graph. The method further comprises processing the probe data to calculate one or more vehicle paths traversing the closure link graph. The method further comprises classifying a closure status of the one or more road links based on the one or more vehicle paths.

According to another embodiment, an apparatus comprises at least one processor, and at least one memory including computer program code for one or more computer programs, the at least one memory and the computer program code configured to, with the at least one processor, cause, at least in part, the apparatus to process the road closure report to determine one or more road links that are associated with a road closure. The apparatus is also caused to construct a closure link graph comprising the one or more road links, one or more upstream road links relative to the one or more road links, and one or more downstream road links relative to the one or more road links. The one or more upstream road links and the one or more downstream road links are open for travel. The apparatus is further caused to retrieve probe data collected from one or more vehicles traveling on a plurality of roadways corresponding to the closure link graph. The apparatus is further caused to process the probe data to calculate one or more vehicle paths traversing the closure link graph. The apparatus is further caused to classify a closure status of the one or more road links based on the one or more vehicle paths.

According to another embodiment, a non-transitory computer-readable storage medium carries one or more sequences of one or more instructions which, when executed by one or more processors, cause, at least in part, an apparatus to process the road closure report to determine one or more road links that are associated with a road closure. The apparatus is also caused to construct a closure link graph comprising the one or more road links, one or more upstream road links relative to the one or more road links, and one or more downstream road links relative to the one or more road links. The one or more upstream road links and the one or more downstream road links are open for travel. The apparatus is further caused to retrieve probe data collected from one or more vehicles traveling on a plurality of roadways corresponding to the closure link graph. The apparatus is further caused to process the probe data to calculate one or more vehicle paths traversing the closure link graph. The apparatus is further caused to classify a closure status of the one or more road links based on the one or more vehicle paths.

According to another embodiment, an apparatus comprises means for processing the road closure report to determine one or more road links that are associated with a road closure. The apparatus also comprises means for constructing a closure link graph comprising the one or more road links, one or more upstream road links relative to the one or more road links, and one or more downstream road links relative to the one or more road links. The one or more upstream road links and the one or more downstream road links are open for travel. The apparatus further comprises means for retrieving probe data collected from one or more vehicles traveling on a plurality of roadways corresponding to the closure link graph. The apparatus further comprises means for processing the probe data to calculate one or more vehicle paths traversing the closure link graph. The apparatus further comprises means for classifying a closure status of the one or more road links based on the one or more vehicle paths.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (or derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

For various example embodiments, the following is applicable: An apparatus comprising means for performing a method of the claims.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings:

FIGS. 6A-6E, 7, 8A-8E, 9A-9E, 10A-10J, and 11A-11D are diagrams of example vehicle path scenarios for evaluating road closure reports, according to one embodiment;

DESCRIPTION OF SOME EMBODIMENTS

Examples of a method, apparatus, and computer program for automatically evaluating road closure reports are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Figure 1:
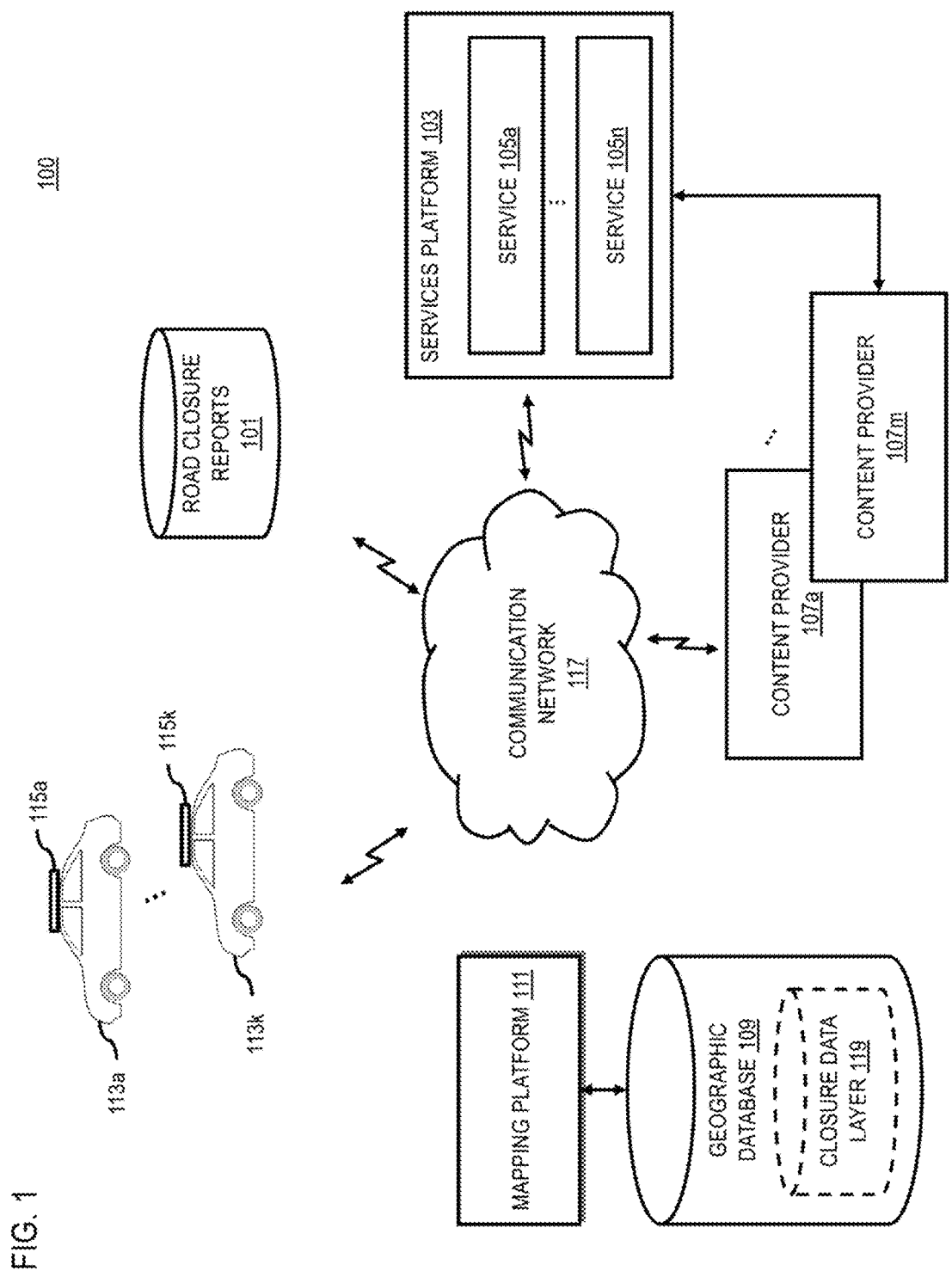
FIG. 1 is a diagram of a system capable of automatically evaluating road closure reports, according to one embodiment.

FIG. 1 is a diagram of a system 100 capable of automatically evaluating road closure reports, according to one embodiment. Generally, traffic incidents such as road closures (e.g., road closure reports 101) are published by government/municipality agencies, local police, and/or third-party official/semi-official sources (e.g., a services platform 103, one or more services 105a-105n, one or more content providers 107a-107m, etc.). By way of example, the published road closure reports 101 can specify the roadway (e.g., by name or matched to specific road link records of digital map data such as a geographic database 109) that has been closed or partially closed to traffic (e.g., vehicular and/or non-vehicular traffic). Closure refers, for instance, to restricting traffic flow on a particular roadway such that no vehicle or a reduced number of vehicle (e.g., reduced with respect to an average free flow traffic volume on the roadway) is permitted or able to travel on the roadway. In one embodiment, a traffic provider (e.g., via a mapping platform 111) monitors the feeds of the road closures reports 101, extracts the affected roadways, and provides traffic data and/or other functions based on the road closure reports 101 (e.g., displays the location of reported closures on the map, generates navigation routes to avoid reported road closures, etc.). Then, traditional traffic service providers wait for another message or road closure report 101 indicating that the road has opened to provide updated data and/or functions. In other words, traditional traffic service providers have historically placed total reliance on these road closure reports 101.

However, several potential issues can arise from this over reliance on road closure reports 101 and result in providing poor quality data and/or poor user experiences for users of the traffic service. For example, the road closure report 101 could be wrong; i.e., the reported road segment is actually not closed. In another scenario, the road closure report 101 might be inaccurate in time and/or location. For example, the road closure report 101 may have been based on a construction-scheduled closure with predetermined start and end times. However, the scheduled closure may have started and/or ended at a different time than specified in the schedule. In yet another scenario, the road closure report 101 could be due to an unscheduled event, and the provider or source of the report 101 could be very late to publish the expiration of the closure event, or miss publishing the expiration of the closure (e.g., the re-opening of the road) completely.

In such cases, users of the traffic service that relies on the problematic data can suffer from unexpected delays, reroutes, etc. As a result, the user may gradually lose their trust in the service if such events occur frequently. To minimize this risk, traffic service providers have traditionally deployed human resources to monitor closures from multiple sources and to report incidents accurately. However, human or manual monitoring and evaluation of can be resource intensive and may not scale well. For example, as the number of incidents or closures increase (e.g., with increased coverage area), so does the labor cost and chances for human errors. Therefore, traffic service providers face significant technical challenges to reducing manual resources needed for human-based evaluation of road closure reports 101.

To address this problem, the system 100 introduces a capability to build a connected roadway network around a reported closure, e.g., referred to as roadway graph or a closure link graph (e.g., a mathematical graph) henceforth. In one embodiment, the system 100 also uses probe data collected from vehicles 113*a*-113*k* (also collectively referred to as vehicles 113) to produce vehicle paths. By way of example, the probe data can include, at least in part, location data sampled from the respective location sensors 115*a*-115*k* (also collectively referred to sensors 115, such as GPS sensors, compasses, accelerometers, gyroscopes, etc.). The calculated vehicle paths are then mapped onto the roadway graph or closure link graph. In one embodiment, the system 100 then calculates a closure score or traffic score based on the matched vehicle paths and the underlying structure of the roadway graph. Using this score, the system 100 automatically evaluates the reported roadway (e.g., in its entirety or based on its individual links or segments) to see if the roadway is open, closed, and/or partially close. If the system 100 cannot draw that conclusion (e.g., there is not enough probe data, or only parts of the roadway seems open while other parts seem closed), the reported roadway can be divided into smaller road segments. Then, the system 100 evaluates each smaller road segment individually to determine whether they are partial openings or closures.

In summary, according to various embodiments, the system 100 can look for vehicle activity (e.g., via probe data) on reportedly closed roads, and then periodically try to prove there is enough data to open the road. If the system 100 cannot prove that, it passively confirms closure. In other words, the system 100 couples road closure reports 101 (e.g., received from governmental or other sources received over a communication network 117) with vehicle probe data (e.g., GPS probe points or location traces collected over the communication network 117). The system 100 can then discover driving patterns from vehicle probes around a reported closure to evaluate whether to confirm or reject the reported road closure. In one embodiment, the system 100 can further use the probe data to automatically monitor detected road closures and flag the closures and/or its corresponding link as reopened if driving patterns change and vehicles are detected as driving through previously reported closed roadways. The closure data that has been evaluated (e.g., confirmed and/or rejected) by the system 100 can then be stored in a closure data layer 119 of the geographic database 109. The evaluated closure data layer 119 can then be published or otherwise used by the mapping platform 111 (and/or related traffic service provider) to provide the data (e.g., for presentation in a mapping user interface) and/or related functions (e.g., navigation routing, calculating estimated times of arrival, etc.) to end users.

Figure 2:
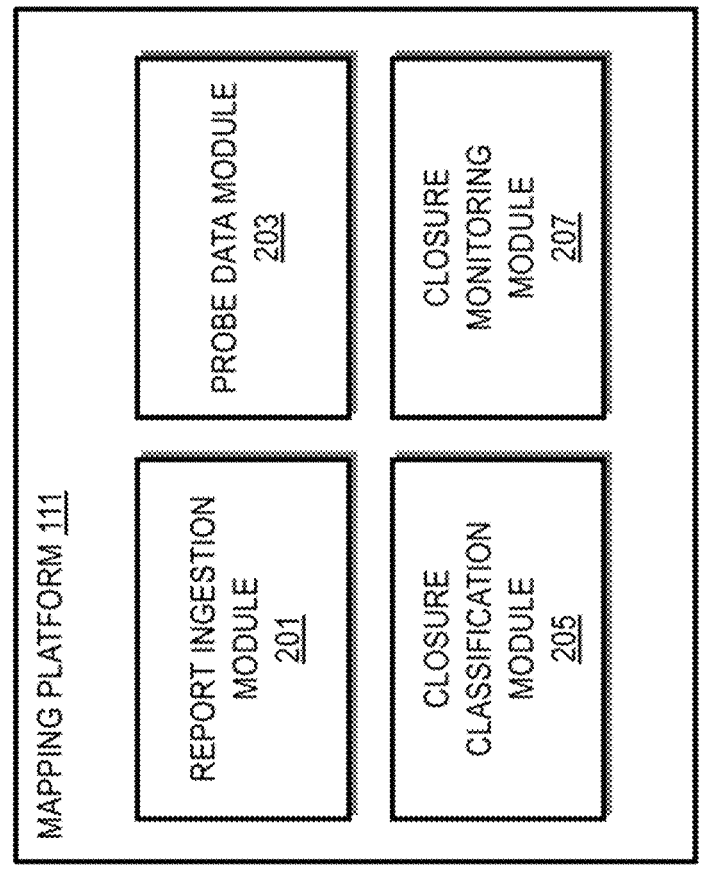
FIG. 2 is a diagram of the components of a mapping platform configured to evaluate road closure reports, according to one embodiment.

FIG. 2 is a diagram of the components of a mapping platform 111, according to one embodiment. By way of example, the mapping platform 111 includes one or more components for automatically evaluating road closure reports according to the various embodiments described herein. It is contemplated that the functions of these components may be combined or performed by other components of equivalent functionality. In this embodiment, the mapping platform 111 includes a report ingestion module 201, a probe data module 203, a closure classification module 205, and a closure monitoring module 207. The above presented modules and components of the mapping platform 111 can be implemented in hardware, firmware, software, or a combination thereof. Though depicted as a separate entity in FIG. 1, it is contemplated that the mapping platform 111 may be implemented as a module of any of the components of the system 100 (e.g., a component of the vehicle 113, services platform 103, services 105*a*-105*n* (also collectively referred to as services 105), etc.). In another embodiment, one or more of the modules 201-207 may be implemented as a cloud-based service, local service, native application, or combination thereof. The functions of the mapping platform 111 and modules 201-207 are discussed with respect to FIGS. 3-17 below.

Figure 3:
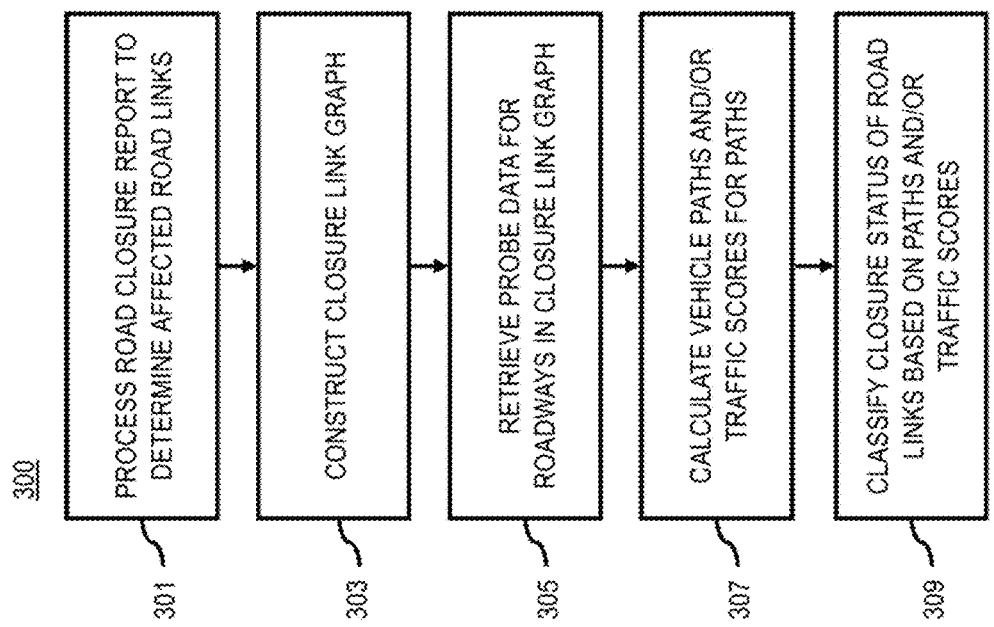
FIG. 3 is a flowchart of a process for automatically evaluating road closure reports, according to one embodiment.
Figure 18:
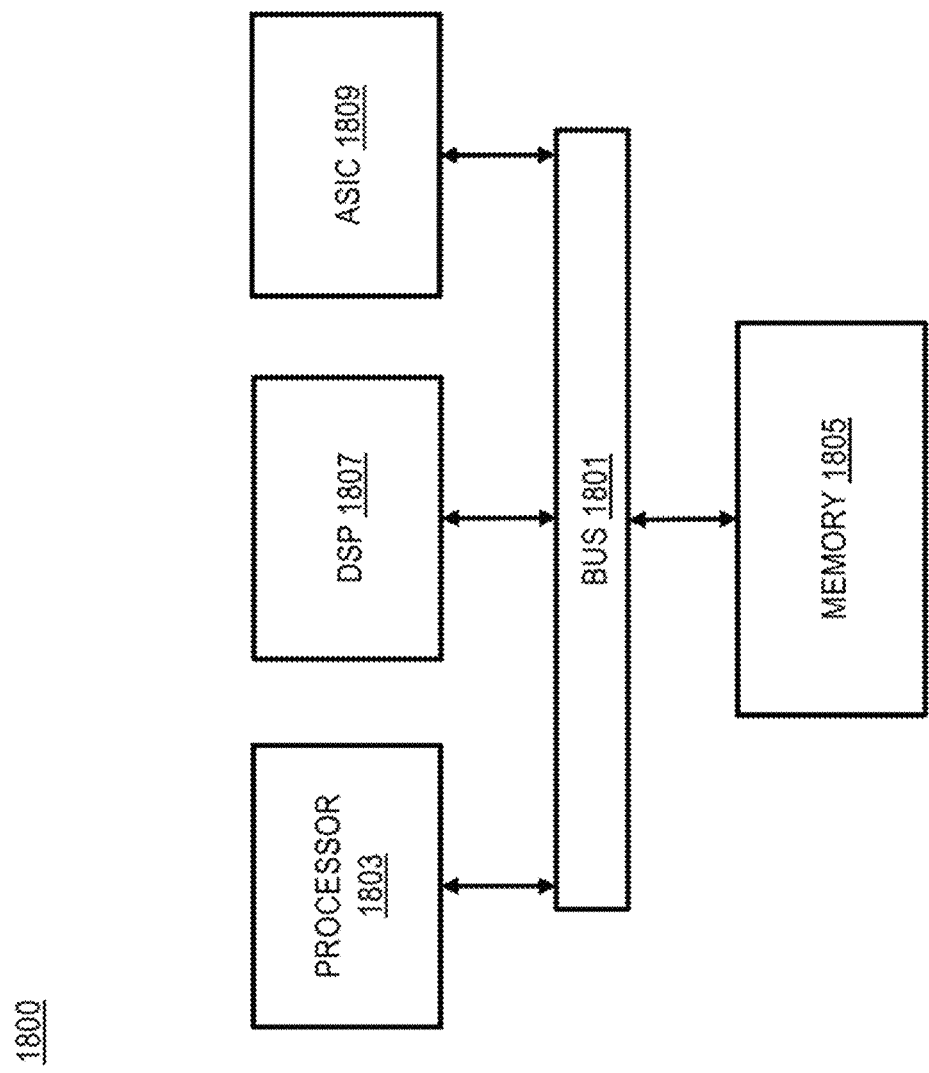
FIG. 18 is a diagram of a chip set that can be used to implement an embodiment.

FIG. 3 is a flowchart of a process for automatically evaluating road closure reports, according to one embodiment. In various embodiments, the mapping platform 111 and/or any of the modules 201-207 may perform one or more portions of the process 300 and may be implemented in, for instance, a chip set including a processor and a memory as shown in FIG. 18. As such, the mapping platform 111 and/or any of the modules 201-207 can provide means for accomplishing various parts of the process 300, as well as means for accomplishing embodiments of other processes described herein in conjunction with other components of the system 100. Although the process 300 is illustrated and described as a sequence of steps, it is contemplated that various embodiments of the process 300 may be performed in any order or combination and need not include all of the illustrated steps.

In step 301, the report ingestion module 201 receives and/or processes one or more road closure reports 101 to determine road links affected by or otherwise associated with the reported road closure. As described above, a road closure report 101 is any message or data record originating or transmitted from a road closure source (e.g., a government/municipality agency, police agency, third-party sources, etc.). It is contemplated that the road closure report 101 can be transmitted in any format known in the art and includes data indicating a location or roadway affected by a road closure. The data can include a direct indication of the affected link (e.g., by specifying the link IDs corresponding to the roadway or segments affected by the reported road closure), or an indirect indication (e.g., address or offset location that can then be map-matched or translated to corresponding links of the geographic database 109).

In step 303, the report ingestion module 201 then constructs a closure link graph comprising a connected set of links including the road links indicated in the processed road closure report 101. In one embodiment, a road link is the unit representation of a roadway in a digital map such as the geographic database 109. Additional description of a link data record is described below with respect to FIG. 18. Generally, a roadway between two consecutive intersections can be represented by one or more links. However, a single link does not span more than the distance between two intersections.

Figure 4:
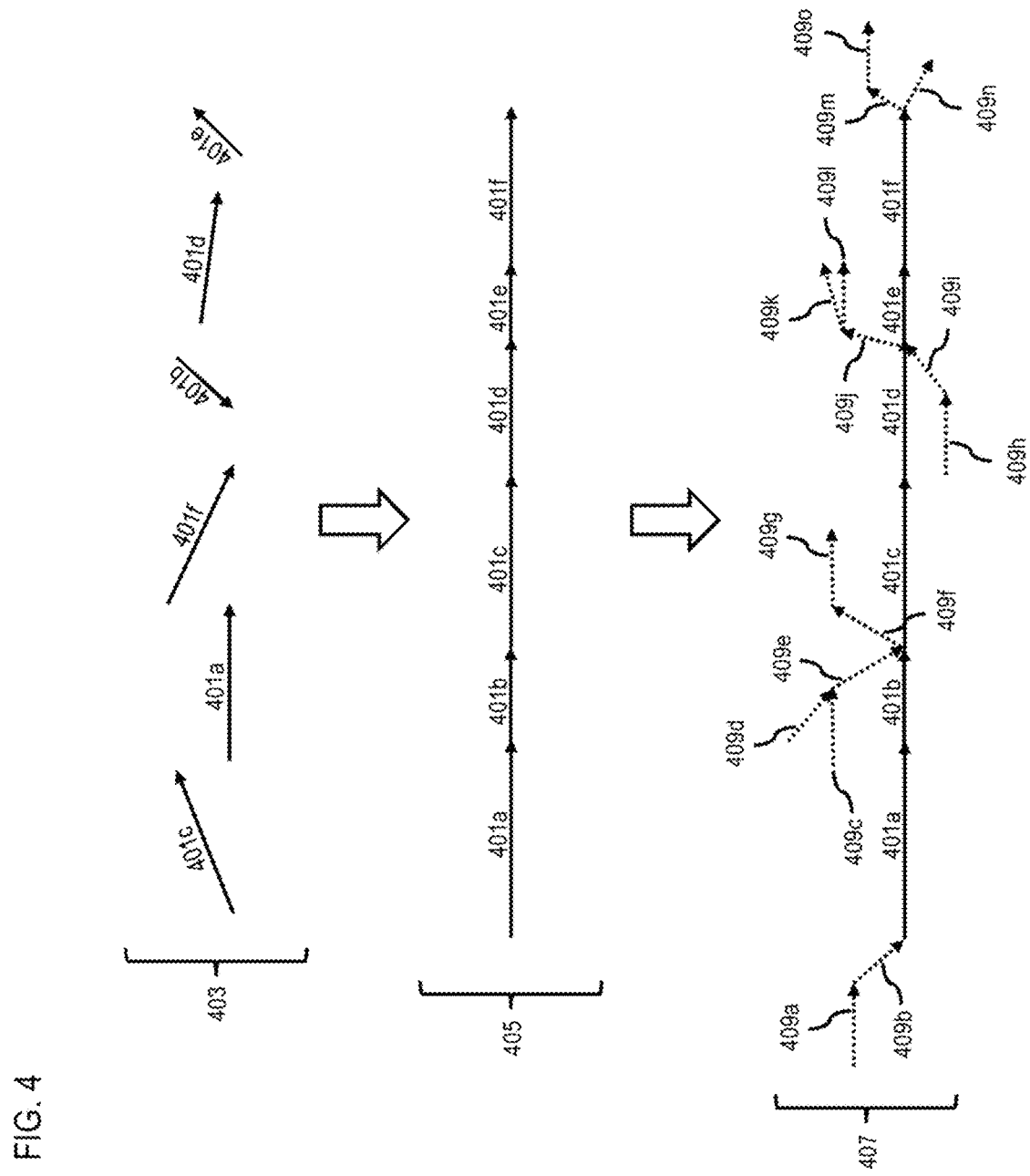
FIG. 4 is a diagram of illustrating an example of constructing a closure link graph, according to one embodiment.

In one embodiment, the closure link graph is used to seal or designate the reported closure area and monitor traffic around and through the closure within the area represented by the closure link graph. As described above, a closure incident is reported on a stretch of roadway (e.g., via a road closure report 101). This closure report 101 is then converted into a set of links. As shown in FIG. 4, these links (e.g., links 401*a*-401*f*, also collectively referred to as links 401) can be and unordered set 403 (e.g., unordered with respect to a spatial arrangement).

If the links 401 are unordered, the report ingestion module 201 initiates the building of the closure link graph around these links 401 by ordering the links 401 so that the end of one link is arranged to match the beginning of the next closest link based on the respective locations of their beginning and end nodes. The ordered set 405 of the links 401 is also illustrated in FIG. 4. The ordered set 405 of the links 401 corresponds to the abstract representation of the physical structure road segments making up the roadway indicated in the processed road closure report 101.

Next, the report ingestion module 201 adds links upstream to and downstream from the reported closures to construct the closure link graph 407. Since these links (e.g., links 409*a*-409*o*, also collectively referred to as links 409) are not among the original links 401 identified in the processed road closure report 101, the links 409 are assumed to be open and not closed to traffic. The resulting the closure link graph 407 then includes the reportedly closed links 401 buffered by links 409 that are open for travel. In other words, with the addition of open upstream and downstream links 409, the closure (e.g., on links 401) is now isolated. For example, given the closure links 401, all traffic going into and out of the closure region can be monitored using the traffic flowing in the open links 409.

In one embodiment, the flow of traffic is determined by collecting probe data from vehicles. For example, in step 305, the probe data module 203 retrieves probe data collected from vehicles traveling on the roadways corresponding to the closure link graph 407. In one embodiment, probe data includes raw GPS probes (e.g., probe points) sent from vehicles indicating their respective locations by, for instance, a latitude and longitude pair. Then, each probe point is placed onto most probable link on the map using any map matching process known in art. On example map-matching process works as described in the following section. A map is defined by a set of links and their geographic coordinates. Because GPS (or other similar location positioning technology) is not 100% accurate, the coordinates of a vehicle GPS probe most of the time does not fall onto a link perfectly. To account for this error, map matching algorithms take the coordinate of a GPS probe, and find the neighboring links whose coordinates are close to the probe. Then, the map matching process places the vehicle probe onto the most probable link based on pre-defined criteria based on the specific map matching process or algorithm being used.

In one embodiment, to better control for map matching error, the probe data module 203 described herein work with vehicle paths instead of map matched vehicle probes. The reason is that map matched vehicle probes can be more are susceptible to map matching errors than vehicle paths. By way of example, a vehicle path or trajectory is derived from two consecutive map matched vehicle probes. The path can then be increased by adding new probe points on top of the previously calculated vehicle path as new probe points are collected.

In one embodiment, according to step 307, the probe data module 203 can process the probe data to calculate vehicle paths traversing the monitored closure link graph 407 according to the example process described below. Firstly, for a specific vehicle, the probe data module 203 takes the first and second probe points received, e.g., denoted as probe1 and probe2. If the time difference between these probes is more than a specified threshold, the probe data module 203 discards the initial probe1, and the sets probe1=probe2. The probe data module 203 then retrieves the next probe point to set as probe 2 to iteratively evaluate the time difference.

If the time different difference is less than the specified threshold, the probe data module 203 builds a vehicle path from probe1 to probe2. It is contemplated that the probe data module 203 can use any path building process or algorithm such as but not limited to A* pathfinding or equivalent. The probe data module 203 then records the new path for the vehicle, discards probe1, sets probe1=probe2, and retrieves the next probe point to act as probe2 until all probe points collected for the specific vehicle have been processed.

In one embodiment, every vehicle can send its probe points (e.g., GPS probes) at a different frequency; this frequency can vary from 1 second to a few minutes. Therefore, as a vehicle drives through multiple links, there is no guarantee that it will send a probe from every link. For instance, if a vehicle drives at fast speeds over short links while sending a probe every 2 minutes, it would almost be certain that its two consecutive probes will arrive from non-neighboring links. This sporadic probe reporting can make it more technically challenging to build accurate vehicle paths.

To address this technical challenge, in one embodiment, as part of its link graph building process, the report ingestion module 201 methodology can aggregate links and their probes where it makes sense into superlinks. In one embodiment, a superlink consists of ordered links such that if a vehicle travels through one of its links, it is guaranteed to travel through the other links of the same superlink as well. An example of a superlink is a section of a highway stretching between two entrance/exit ramps. When on this stretch a vehicle must go through all the links part when driving this stretch. Another example is a roadway between two intersections in a city road. Because a superlink comprises one or more links, superlinks are often longer than normal links of the geographic database 109, thereby increasing the probability that a probe point of a vehicle path would fall on the superlink than on a normal link. In addition, the superlinks can decrease the overall complexity of the closure link graph 407 without affecting the quality of the closure evaluation results, thereby reducing computing resources (e.g., processing resources, memory resources, bandwidth resources, etc.) associated with automatic evaluation of road closure reports according to the various embodiments described herein.

Figure 5:
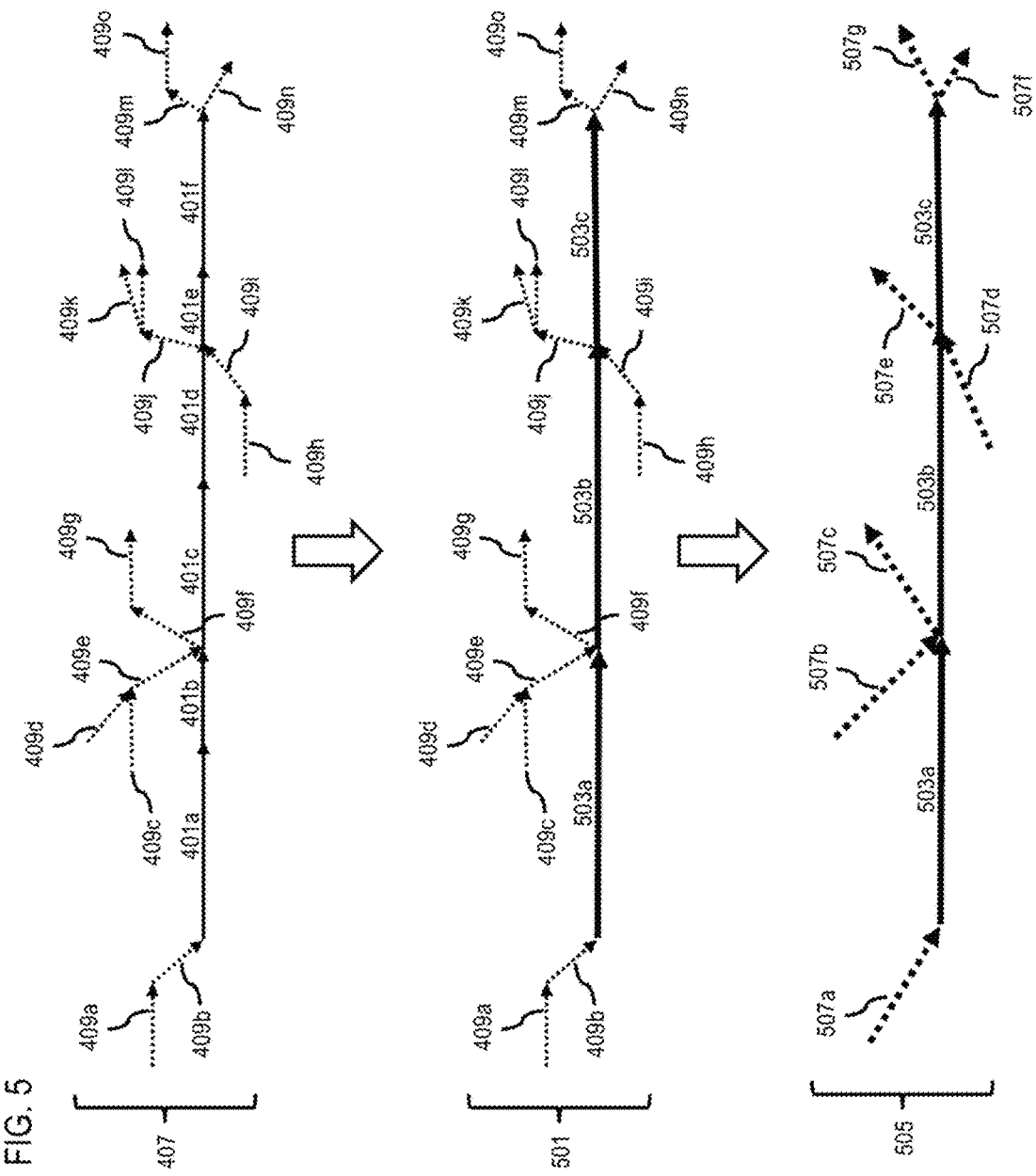
FIG. 5 is diagram of aggregating road links of a closure link graph into superlinks, according to one embodiment.

FIG. 5 is diagram of an example of aggregating road links of the closure link graph 407 into superlinks, according to one embodiment. FIG. 5 continues the example closure link graph 407 of FIG. 5 and illustrates a first superlink graph 501 that is a version of the closure link graph 407 in which the reportedly closed links 401 are aggregated into respective superlinks. In this example, links 401*a* and 401*b* can form a superlink 503*a* because a vehicle on link 401*a* must also travel through link 401*b*. Similarly, links 401*c* and 401*d* can be aggregated as superlink 503*b*, and links 401*e* and 401*f* can be aggregated into superlink 503*c*.

In one embodiment, the upstream and downstream links 409 can be aggregated into superlinks in addition to the links 401 to construct superlink graph 505. For example, links 409*a* and 409*b* can be aggregated into superlink 507*a*, links 409*c*-409*e* can be aggregated into superlink 507*b*, links 409*f* and 409*g* can be aggregated into superlink 507*c*, links 409*h* and 409*i* can be aggregated into superlink 507*d*, links 409*j*-409*l* can be aggregated into superlink 507*e*, and links 409*m* and 409*o* can be aggregated into superlink 507*g*. Referring for instance to the example of FIGS. 4 and 5, if a vehicle has probe points on link 401*a*, 401*c*, and 401*f*, the probe ingestion module 203 can calculate the vehicle path to include links all links 401*a*-401*f* based on the superlinks 503*a*-503*c*.

In one embodiment, the closure classification module 205 can use the calculated vehicle paths to calculate a traffic score or closure score indicative of traffic on the links of the constructed closure link graph 407. For example, if the vehicle paths indicate that many vehicles pass through a link and/or superlink, the link will be calculated to have a higher traffic score; hence its likelihood of being closed will be low. In this case, the value of the traffic score can be increased monotonically with the number of vehicles passing through the link being evaluated based on the calculated vehicle paths. By way of example, depending on a vehicle's path, its contribution to link traffic can be normalized to a score between 0.0 and 1.0 or equivalent. This example scoring scheme results, for instance, in the following effect: the higher the likelihood that a vehicle has a path through a given link, the higher the traffic score; hence the higher the contribution of that vehicle to the traffic on the evaluated link. In one embodiment, a score of 0.0 means no contribution while 1.0 indicates to full contribution. It is noted that this scoring scale is provided by way of illustration and not as a limitation. It is contemplated that any scoring scale can be used.

In one embodiment, a vehicle's or path's traffic score can also be a function of how well a vehicle's probe is map-matched to a link. The quality of map matching can be captured, for instance, by a prominence parameter. While map matching places a raw probe point onto the most probable link, the map matching process can also provide subsequent best matching links and map matching scores for all of these reported links. The probe would be map matched onto the link with highest score. However, the relative differences between the map matching probabilities of various candidate links can be still be used to calculate a map matching prominence that can be used to indicate how confident one is with the map matching result. For example, if the map matching score of best matching link is a couple of degrees of magnitude higher than that of the second best matching link, the mapping platform 111 can be very confident with map matching the probe onto the best matching link. On the other hand, if map matching scores for the best and second best matching links are close to each other (e.g., within a threshold value), chances for a map matching error increase. Therefore, in one embodiment, the map matching prominence can be calculated to capture this entity as follows:

$$\text{Map matching } prominece = \frac{\text{best link map matching score/probability}}{\text{second best link map matching score/probability}}$$

In step 309, the closure classification module can classify the closure status (e.g., open, closed, partially closed, etc.) of links the closure link graph 407 based on the vehicle paths, the underlying structure of the closure link graph 407, the map matching prominence, and/or other factors as described in more detail below. In one embodiment, the classification of the links can be described with respect to various possible vehicle path scenarios and how that vehicle contributes to total link score.

In one embodiment, when calculating a traffic score from one vehicle on a specific link or superlink of interest (denoted as a Current Link) depending on the location of the vehicle's probes, several different scenarios are possible. Examples the scenarios are illustrated in FIGS. 6A-11E, according to one embodiment. In the examples of FIGS. 6A-11E, a vehicle score (its contribution to link traffic) is calculated for the Current Link 601 only. The IN Link 603 denotes a link from which a vehicle 113 could go into the Current Link 601 (e.g., an upstream link with respect to the Current Link 601). Note that a vehicle 113 could also go from the IN Link 603 to a destination link other than the Current Link 601 even if the other destination link is not included in the closure link graph. Similarly, the OUT Link 605 refers to a link to which a vehicle could go from the Current Link 601 (e.g., a downstream link with respect to the Current Link 601). Again, a vehicle from the Current Link 601 could also go to a destination different than the OUT Link 605.

Figure 6A:
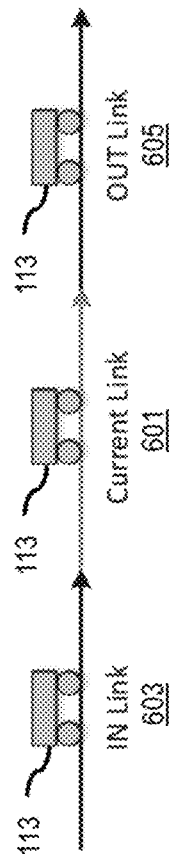
Figure 6B:
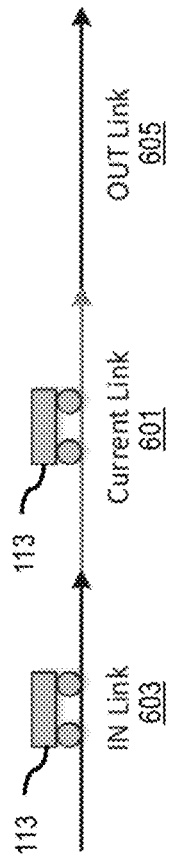
Figure 6C:
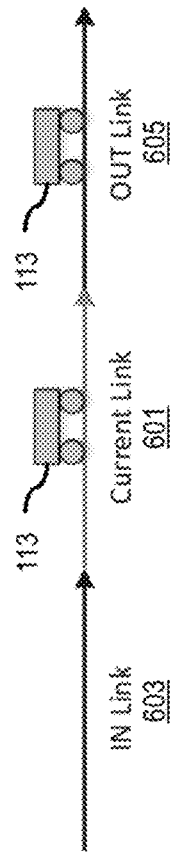
Figure 6D:
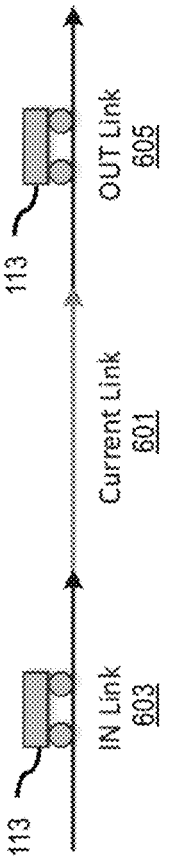
Figure 6E:
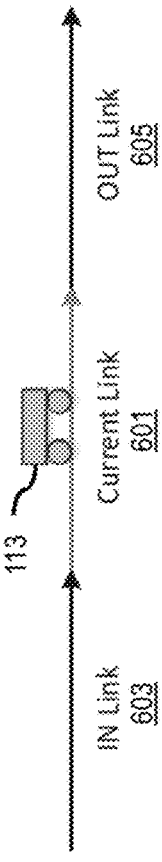

FIGS. 6A-6E illustrate five of the vehicle path scenarios that can occur relative to the Current Link 601. More specifically, FIG. 6A illustrates a vehicle path scenario in which the same vehicle 113 has probe points on (e.g., "is seen on") the IN Link 603, the Current Link 601, and the OUT Link 605 (also referred to as Scenario 1). FIG. 6B illustrates a vehicle path scenario in which the same vehicle 113 is seen on the IN Link 603 and the Current Link 601, but not on the OUT Link 605 (also referred to as Scenario 2). FIG. 6C illustrates a vehicle path scenario in which the same vehicle 113 is seen on the Current Link 601 and the OUT Link 605, but not on the IN Link 603 (also referred to as Scenario 3). FIG. 6D illustrates a vehicle path scenario in which the same vehicle 113 is seen on the IN Link 603 and the OUT Link 605, but not on the Current Link 601 (also referred to as Scenario 4). FIG. 6E illustrates a vehicle path scenario in which the same vehicle 113 is seen only on the Current Link 601, but not on the In Link 603 or the OUT Link 605 (also referred to as Scenario 5).

The following section describes each Scenario 1-5 illustrated in FIGS. 6A-6E, their sub-scenarios, and how a vehicle's contribution to link traffic (e.g., represented as a score) is calculated for evaluating road closure reports.

Figure 7:
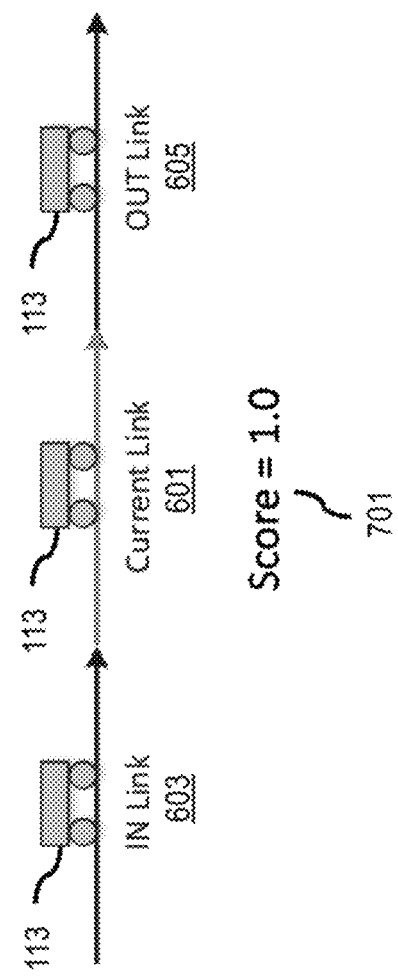

FIG. 7 illustrates Scenario 1 of FIG. 6A in which a vehicle 113 is seen on all three of the IN Link 603, the Current Link 601, and the OUT Link 605. In one embodiment, this is the ideal pattern for a vehicle 113 because its probe is seen on the previous link, current link, and then the next link. In one embodiment, a maximum score (e.g., a score of 1.0) is given to the vehicle 113 on the Current Link 601. That means that the closure classification module 205 is very confident that the vehicle 113 is truly on current link and is therefore fully contributing to link traffic. Scenarios 2-5 of FIGS. 6B-6E follow similar logic.

For example, FIGS. 8A-8E the four Sub-scenarios 2.1-2.4 of Scenario 2 of FIG. 6B in which the same vehicle 113 is seen on the IN Link 603, the Current Link 601, but not on the OUT Link 605. In this scenario, while the vehicle 113 has been map matched on the Current Link 601 and the IN Link 603, the ideal full path is not complete (e.g., the vehicle is not seen on the OUT Link 605). There could be a few reasons for this: (1) the probe was falsely map-matched onto the Current Link 601 and/or IN Link 603, or (2) the probe which was supposed to be on the OUT Link 605 is missing due to some reason.

To account for this uncertainty, the closure classification module 205 can use map-matching prominence and the underlying link structure to assign a score to vehicle 113. As described above, the score can be used to determine how much the vehicle 113 contributes to traffic on the Current Link 601. In one embodiment, the map-matching prominence can be High (H) or Low (L) using a prominence threshold applied to the map-matching prominence calculated as described above. In both cases, the link to which the vehicle 113 is matched has the highest map-matched score among candidate links. For High prominence, the map-matching score of best matching link is much higher (e.g., higher than a threshold value) than that of the second best matching link. For Low prominence, the map-match scores of the best matching link and the second best matching link are similar (e.g., less than a threshold value difference). There are, for instance, four Sub-scenarios 2.1-2.4 arising from the combination of H and L of two probes when applied to Scenario 2.

Figure 8A:
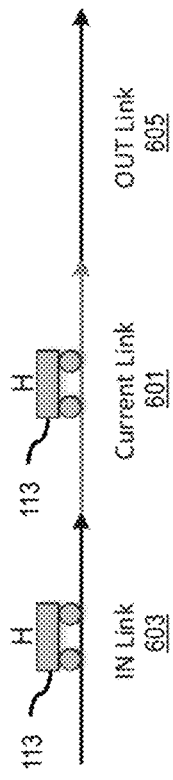

FIG. 8A illustrates Sub-scenario 2.1 in which vehicle probes on both the IN-Link 603 and the Current Link 601 have high prominence (e.g., indicated by "H"). Because both links have high prominence, the closure classification module 205 can determine that map-matching error is unlikely, calculate a relatively high score (e.g., 1.0) for the link to reflect the certainty of seeing the vehicle 113 on the Current Link 601.

Figure 8B:
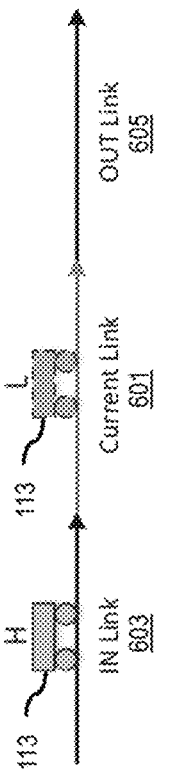
Figure 8C:
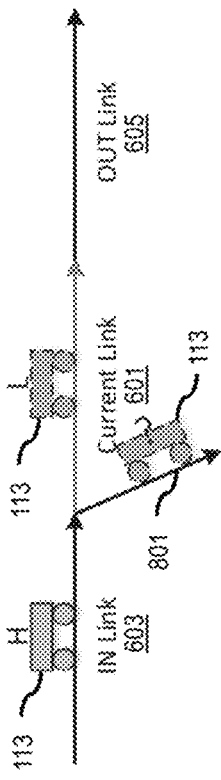

FIGS. 8B and 8C illustrates Sub-scenario 2.2 in which vehicle a probe on the IN Link 603 has high prominence while a probe on the Current Link 601 has low prominence (e.g., indicated by "L"). This low prominence indicates, for instance, that the probe might have been falsely map-matched onto the Current Link 601. The closure classification module 205 can use this possibility to reduce the score from 1.0 (e.g., calculate a score less than 1.0). This reduction can be based on the underlying structure or arrangement of the closure link graph including the IN Link 603, the Current Link 601, and the OUT Link 605. For example, the link structure as shown in FIG. 8B indicates that when exiting the IN Link 603 there is no known alternate path to the Current Link 601 that can be taken. As a result, the vehicle 113 on the IN Link 603 (prominence=H) very likely passes through the Current Link 601 and can be scored more highly.

In the example of FIG. 8C, the link structure shows that the vehicle 113 has an alternate path 801 from the IN Link 603, and the vehicle 113 might have gone either way, including not going through the Current Link 601 because the low prominence of the Current Link 601. Hence, the closure classification module 205 can reduce the score further down from 1.0, making it less than the score of the example of FIG. 8B.

Figure 8D:
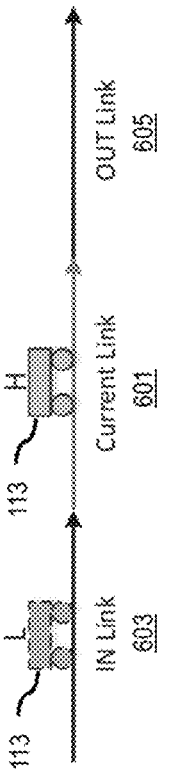

FIG. 8D illustrates Sub-scenario 2.3 in which the probe on the IN Link 603 has low prominence while the probe on the Current Link 601 has high prominence. This prominence pattern indicates that the closure classification module 205 can be confident that the vehicle 113 is on the Current Link 601, and that there is some supporting data that the vehicle 113 was also on the IN Link 603. Again, because this is not the ideal pattern, the closure classification module 205 can calculated a reduced score.

Figure 8E:
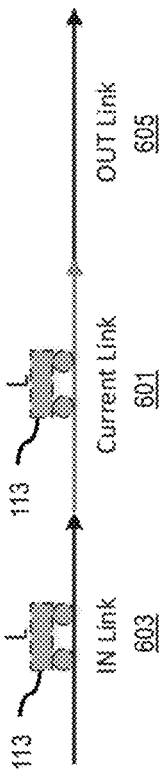

Sub-scenario 2.4 is shown in FIG. 8E where probes on both the IN Link 603 and Current Link 601 have low prominence. In this example, these are still links with highest map-matching scores, but their second-best alternatives have map matching scores which are not too far away from those of best link matches (e.g., within a threshold difference). As a result, there may not be enough data to conclude whether the vehicle probe points were falsely map-matched or not, and the closure classification module 205 can calculate a relative low score (e.g., a score at or closer to 0.0).

In one embodiment, Scenario 3 of FIG. 6C refers to a case where the same vehicle 113 is seen on both the Current Link 601 and the OUT-Link 605, but not on the IN Link 603. Scenario 3 is, for instance, the reciprocal of Scenario 2 described above. As with Scenario 2, there are four Sub-scenarios 3.1-3.4 arising from different combinations of High and Low map-matching prominence of the two probes (e.g., one probe on the Current Link 601, and the other probe for the OUT Link 605). Sub-scenarios 3.1-3.4 are illustrated respectively in FIGS. 9A-9E.

FIG. 9A illustrates Sub-scenario 3.1 in which probes on both the Current Link 601 and the OUT Link 605 have high prominence. As a result, the closure classification module 205 can conclude that map-matching error is unlikely, similar to Sub-scenario 2.1, and calculate a relatively higher score (e.g., at or close to 1.0).

FIG. 9B illustrates Sub-scenario 3.2 in which a probe on the Current Link 601 has high prominence while a probe on the OUT Link 605 has low prominence. Hence, the closure classification module 205 can be confident that vehicle 113 is on the Current Link 601. In addition, there is some supporting data that vehicle 113 was also on the OUT Link 605. Sub-scenario 3.2 is similar to Sub-scenario 2.3 and is not the ideal pattern, and therefore the score for the Current Link 601 can be reduced accordingly.

FIGS. 9C and 9D illustrate Sub-scenario 3.3 in which a probe on the OUT Link 605 has high prominence while a probe on the Current Link 601 has low prominence. In other words, the vehicle 113 might have been falsely map-matched onto the Current Link 601, which can reduce the score. In one embodiment, the amount of reduction can be based on the underlying structure of the links. As with Sub-scenario 2.3 above, FIG. 9C illustrates a link structure with no alternate path moving from the Current Link 601 to the OUT Link 605. Because the OUT Link 605 has high prominence, the closure classification module 205 can determine that is very likely that the vehicle 113 passed through the Current Link 601 to reach the OUT Link 605 and calculate a relatively higher score accordingly. In contrast, FIG. 9D illustrates that there is an alternate path 901 other than the Current Link 601 that the vehicle 113 could have used to reach the OUT Link 605, and the vehicle 113 could have arrived at the OUT Link 605 from either path. Therefore, while both link structure settings of Sub-scenario 3.3 will experience reductions in vehicle traffic score, the latter setting can result in calculating a greater reduction of the score due to increased uncertainty caused by link graph structure.

FIG. 9E illustrates Sub-scenario 3.4 in which vehicle probes on both the Current Link 601 and the OUT Link 605 have low prominence. These are still links with highest map-matching scores; but their second-best alternatives have map matching scores which are not too far away from those of best link matches (e.g., with a threshold difference of the map matching scores). Accordingly, there is not enough data to conclude if vehicles were falsely map-matched or not, and the closure classification module 205 can calculate a relatively low score (e.g., at or close to 0.0).

In one embodiment, Scenario 4 of FIG. 6D is the only setting where the Current Link 601 does not have a probe of a vehicle 113 for which a traffic score for the Current Link 601 is being calculated. The closure classification module 205 can handle this scenario with care. By way of example, the reasons for the absence of a vehicle probe on the Current Link 601 can include but is not limited to: (1) probes on the IN Link 603 and the OUT Link 605 were falsely map-matched; (2) probes are correctly map-matched but a vehicle probe on the Current Link 601 is missing due to some reason; (3) probes are correctly map-matched and the vehicle 113 is avoiding the Current Link 601 via detour which, e.g., could be the case if the Current Link 601 is closed while the IN Link 603 and the OUT Link 605 are not; etc.

FIGS. 10A-10D illustrate four Sub-scenarios 4.1-4.4 that arise from different combinations of High and Low prominence determined from map-matching the two observed probes (e.g., one probe for the IN Link 603, and the other probe for the OUT Link 605).

Figure 10A:
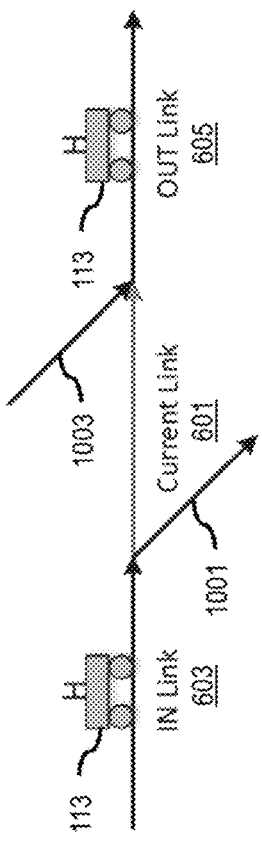
Figure 10B:
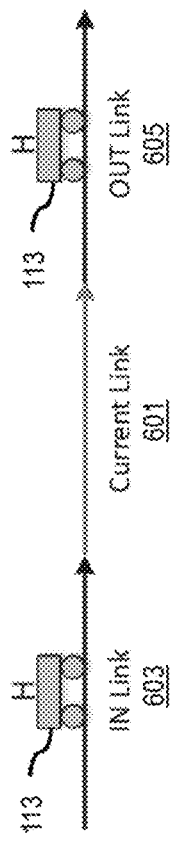

Sub-scenario 4.1 is a setting in which the probes on the IN Link 603 and the OUT Link 605 have high map matching prominence. In this case, the vehicle traffic score can vary depending on whether link graph structure includes alternate paths such that probes seen on the IN Link 603 and the OUT Link 605 could bypass the Current Link 601. FIGS. 10A and 10B illustrate two Sub-scenarios 4.1.1 and 4.1.2 of the Sub-scenario 4.1 that arise from variations in link graph structure.

FIG. 10A illustrates Sub-scenario 4.1.1 in which the Current Link 601 is not on the only possible path between the IN Link 603 and the OUT Link 605. In this example, a probe on the IN Link 603 can take an alternative path 1001 and avoid the Current Link 601. Similarly, the probe on the OUT Link 605 could be coming from a link 1003 different to the Current Link 601. There are at least a few possibilities including but not limited to: (1) there could be an alternative path (e.g., via links 1001 and/or 1003) which connects the IN Link 603 to the OUT Link 605; (2) one of the probes has a map-matching error and the other one has bypassed the Current Link 601—e.g., the probe shown on the IN Link 603 is falsely map matched onto the IN Link 603 (and in reality it is not in our link graph); and the probe shown on the OUT Link 605 is correctly map matched and is coming from a link different than Current Link; and/or (3) the vehicle 113 has passed through all three of the IN Link 603, the Current Link 601, and the OUT Link 605, but the probe on the Current Link 601 is missing for some reason.

With respect to reason (3) above, this would be the scenario where the vehicle can contribute fully to the Current Link 601's traffic (e.g., calculated to have a maximum score such as 1.0). However, this scenario has multiple other alternatives where the score and/or contribution would be 0. Therefore, the closure classification module 205 can calculate or assign a low score to Sub-scenario 4.1.1.

FIG. 10B illustrates a Sub-scenario 4.1.2 of the Sub-scenario 4.1 in which the Current Link 601 is the only possible path from the IN Link 603 to the OUT Link 605. In addition, the probes on both the IN Link 603 and the OUT Link 605 have high prominence. Therefore, it can be concluded that map-matching error is unlikely because the only path from the IN Link 603 to the OUT Link 605 goes through the Current Link 601. Therefore, it is very likely that vehicle has gone through Current Link 601, and its score shall reflect this high likelihood.

In one embodiment, Sub-scenario 4.2 includes a probe on the IN Link 603 with high prominence and a probe on the OUT Link 605 with low prominence. In this case, the likelihood of the vehicle 113 passing through the Current Link 601 depends on whether the probe on the IN Link 603 has an alternative path to bypass the Current Link 601. Whether the OUT Link 605 has an alternative input path other than the Current Link 601 is irrelevant because the prominence on the OUT Link 605 is already low. Based on link graph structure variations, two Sub-scenarios 4.2.1 and 4.2.2 emerge as illustrated respectively in FIGS. 10C and 10D.

Figure 10C:
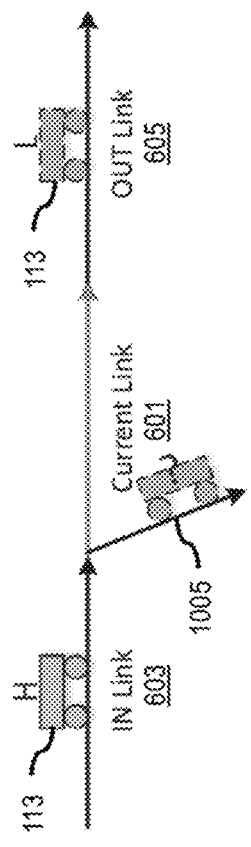

For example, FIG. 10C illustrates Sub-scenario 4.2.1 in which the vehicle 113 on the In Link 603 has an alternative path 1005 to bypass the Current Link 601. Even though prominence on the IN Link 603 is high, the vehicle 113 might have taken the alternative path 1005 before the Current Link 601. On the other hand, the low prominence on the OUT Link 605 suggests some proof that vehicle might have passed through the Current Link 601. Under Sub-scenario 4.2.1, the closure classification module 205 can reduce the calculated score based on the factors such as but not limited to: (1)e following will result in deductions from vehicle score: (1) the Current Link 601 is missing the vehicle 113's probe; (2) the map matching prominence for the probe on the OUT Link 605 is low; and (3) it is possible for the probe on the IN Link 603 to go onto another link by bypassing the Current Link 601.

Figure 10D:
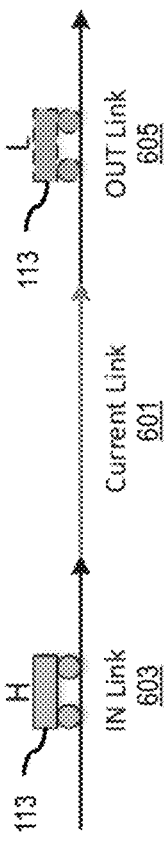
Figure 10G:
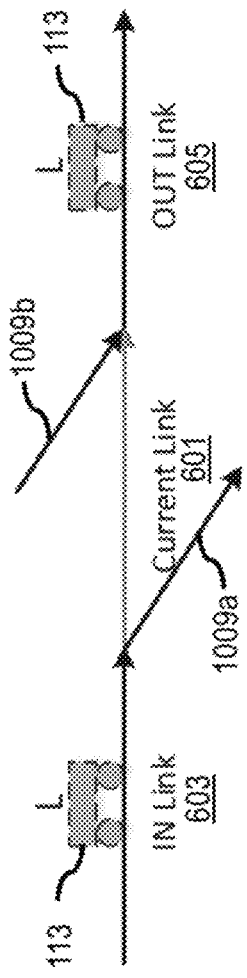
Figure 10H:
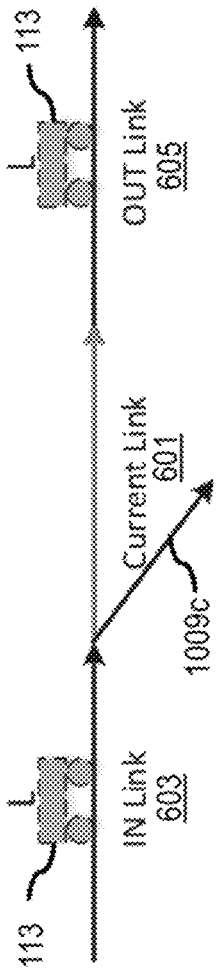
Figure 10I:
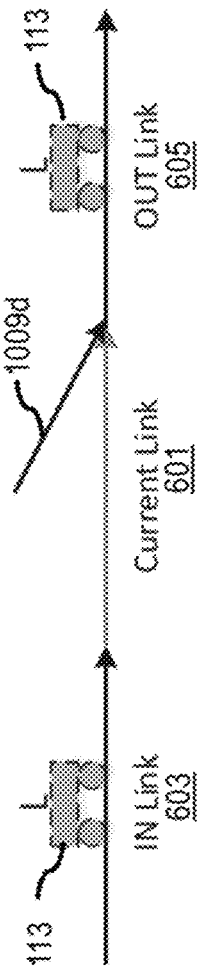
Figure 10J:
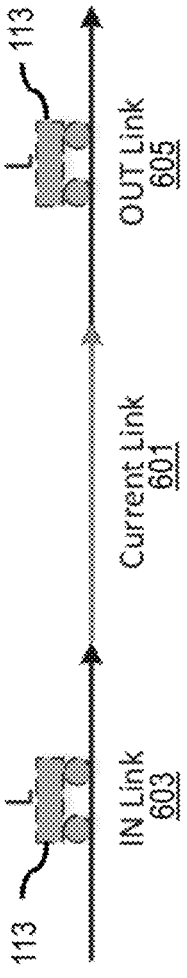

FIG. 10D illustrates Sub-scenario 4.2.2 in which the vehicle 113 on the IN Link 603 can only go to the Current Link 601 (e.g., because there is no alternate path). This scenario is similar to Sub-scenario 4.2.1, the closure classification module 205 can be more confident that the vehicle passed through the Current Link 601 simply because the IN Link 603 feeds into the Current Link 601 only. Nonetheless, the closure classification module 205 can reduce the score by determining factors such as but not limited to: (1) the Current Link 601 is missing a vehicle probe; and/or (2) the OUT Link probe's map matching prominence is low.

Sub-scenario 4.3 is illustrates in FIGS. 10E and 10F and is the reciprocal to Sub-scenario 4.2. More specifically, the probe on the OUT Link 605 has high prominence, whereas the probe on the IN Link 603 has low prominence. In this case, the likelihood of the vehicle 113 passing through the Current Link 601 depends on whether there is an alternative input link feeding into the OUT Link 605 other than the Current Link 601. Whether the IN Link 603 has an alternative output path other than the Current Link 601 is irrelevant because the prominence on the IN Link 603 is already low. Based on link graph structure variations two Sub-scenarios 4.3.1 and 4.3.2 emerge.

FIG. 10E illustrates Sub-scenario 4.3.1 in which an alternative input link 1007 (e.g., other than the Current Link 601) to the OUT Link 605 exists. While prominence on the OUT Link 605 is high, the vehicle 113 might have arrived from the alternative link 1007 that is different than the Current Link 601. On the other hand, low prominence on the IN Link 603 suggests some proof that vehicle 113 might have passed through the Current Link 601. In one embodiment, under Sub-scenario 4.3.1, the closure classification module 205 can reduce the score based on factor including but limited to: (1) the Current Link 601 is missing the vehicle's probe; (2) the IN Link probe's map matching prominence is low; and/or (2) the OUT Link probe could have come from a link different than the Current Link 601.

FIG. 10F illustrates Sub-scenario 4.32 in which the probe on the OUT Link 605 could only come from the Current Link 601. This scenario is similar to Scenario 4.3.1. However, the closure classification module 205 can be more confident that the vehicle 113 passed through the Current Link 601 simply because the high prominence OUT Link probe could only come from the Current Link 601. Nonetheless, under Sub-scenario 4.3.2, the closure classification module 205 can calculate a reduced score based on determining of factors including but not limited to: (1) the Current Link 601 is missing the vehicle's probe; and (2) the IN-Link probe's map matching prominence is low.

In one embodiment, Sub-scenario 4.4 comprises settings that cover a mixture of link structure and low probe prominence combinations for the IN Link 603 and the OUT Link 605 as illustrated in FIGS. 10G-10J. These variations of Sub-scenario 4.4 have different structures that include alternate links 1009a-1009d that provide potential bypass of the Current Link 601 and/or different entries or exist from the IN Link 603 and/or OUT Link 605. Based on these different variations, the closure classification module 205 can use any combination of the following factors to calculate a correspondingly reduced score: (1) the Current Link 601 has no vehicle probe; (2) both the IN Link and OUT Link probes have low map matching prominence; and (3) the presence of alternate paths or other structure which would allow the vehicle to bypass the Current Link 601.

In scenario 5 of FIG. 6E, a vehicle 113 is seen only on the Current Link 601 and not on the IN Link 603 or the OUT Link 605. The closure classification module 205 evaluate and calculate the score for this scenario can also handle this scenario with care. The presence of vehicle probe on only the Current Link 601 can arise reasons including but not limited to: (1) the probe is falsely map-matched to the Current Link 601; (2) the probe is correctly map-matched, but vehicle probe on the IN Link 603 and/or the OUT Link 605 is missing due to some other reason; and/or (3) the probe is correctly map-matched and it belongs to a vehicle which changes its Probe ID each time it sends out its probe information (e.g., for anonymization). In one embodiment, there are at least four Sub-scenarios 5.1-5.4 that arise covering the details of Scenario 5 as illustrated in FIGS. 11A-11D.

FIG. 11A illustrates a Sub-scenario 5.1 in which the vehicle 113 is map-matched onto the Current Link 601 with high prominence. While the vehicle 113 has no probes on either the IN Link 603 or the OUT Link 605, but it does have probes on links 1101a and 1101b further away. Sub-scenario 5.1 scenario could happen, for instance, due to a low probe reporting frequency. As a map-matching error is unlikely, the closure classification module 205 can calculate a relatively high traffic score for this scenario.

FIG. 11B illustrates a Sub-scenario 5.2 that is very similar to Sub-scenario 5.1 with the only difference being that the map matching prominence of the Current Link 601 is low instead of high. In contrast to the previous scenario, the vehicle in Sub-scenario 5.2 can receive higher reductions in its score due to the low prominence.

FIG. 11C illustrates Sub-scenario 5.3 in which the Current Link 601 has an unusually high number of distinct vehicles 113a-113n which are not seen anywhere else on the closure path. In one embodiment, the closure classification module 205 can be configured to detect the Sub-scenario 5.3 and conclude that all of these probes originate from a smaller subset of vehicles that are changing their probe ID's for each probe point. The closure classification module 205 can handle this scenario any number of ways including but not limited to:

(1) Using probe time stamps, the closure classification module 205 can identify temporal patterns and link them to distinct vehicles. The total score would be then the cumulative score over all distinct vehicles.

(2) The closure classification module 205 can assume there is only one vehicle.

(3) The closure classification module 205 can assume that the probes are not originated from a single ID changing vehicle but are the results of map-matching errors. Hence, the score can be calculated to be 0 or very close to 0.

FIG. 11D illustrates Sub-scenario 5.4 in which there is only one probe from one vehicle 113 observed on the Current Link 601. The vehicle 113 has no other trace on any of the links in the entire closure link graph. In this case, there is a very good chance the vehicle 113 is falsely map-matched. Accordingly, the closure classification module 205 can calculate the score to be 0 or very close to 0.

After calculating the vehicle paths and associated traffic scores for each monitored vehicle, the closure classification module 205 can automatically evaluate each road closure report 101 to independently make a road closure decision. In other words, returning to step 309 of FIG. 3, the closure classification module 205 can classify the closure status of the road links of the closure link graph based on the vehicle paths and/or corresponding traffic scores. In one embodiment, the closure classification module 205 uses link traffic score calculated above and checks one of the following:

(1) is the entire road open?
(2) Is the road partially open?
(2) is the entire road closed?

One example decision process includes the following the conditional actions to classify the closure status of the road:

If the entire road is open, this will be the decision.
If not, the algorithm checks whether any of the individual superlinks is open? If so, the decision is that the road is partially open.
If none of the superlinks are open, the algorithm concludes that the entire road is closed.

In one embodiment, this decision process can be performed on an entire road (e.g., comprising multiple links or superlinks) that has been reported as closed, or on the individual links or superlinks of the road.

Figure 12:
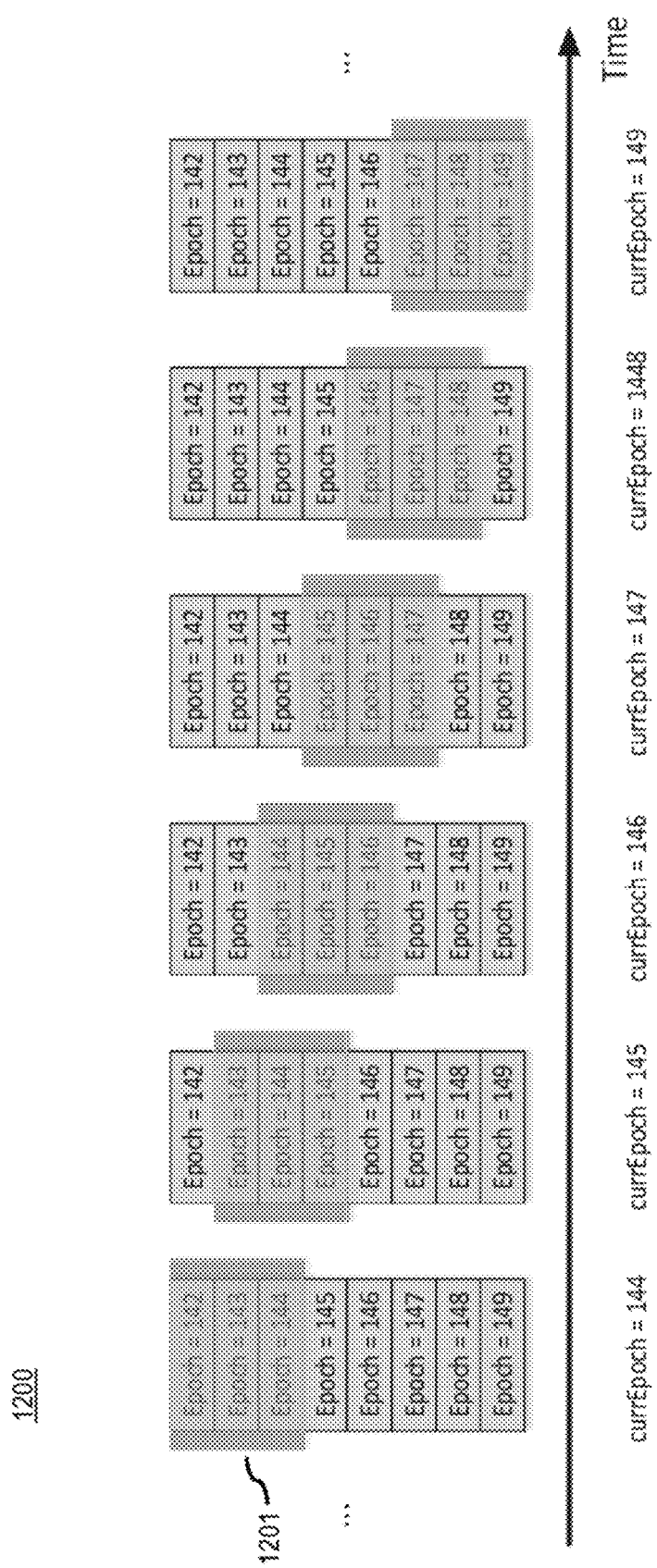
FIG. 12 is a diagram illustrating time epochs for evaluating road closure reports, according to one embodiment.

One embodiment of the decision mechanism to re-open an entire road is discussed as follows. In a first step, periodically for each link or superlink, the closure monitoring module 207 calculates the total score of unique vehicles for the most recent time window (e.g., the most recent X minutes or time epochs). FIG. 12 is a diagram illustrating time epochs for evaluating road closure reports, according to one embodiment. As shown in the example 1200 of FIG. 12, the unit time is a 5-min epoch. The window width 1201 is 15 minutes or 3 epochs. At any epoch, the closure monitoring module 207 looks back for the duration of the time window (e.g., 15 minutes). For instance, if epoch 144 has just ended, the total score of unique vehicles on a superlink is calculated over epochs 142-144. By way of example, the same calculation is repeated periodically at every subsequent epoch: epoch 145 (calculating over epochs 143-145), epoch 146 (calculating over epochs 144-146), etc.

Figure 13:
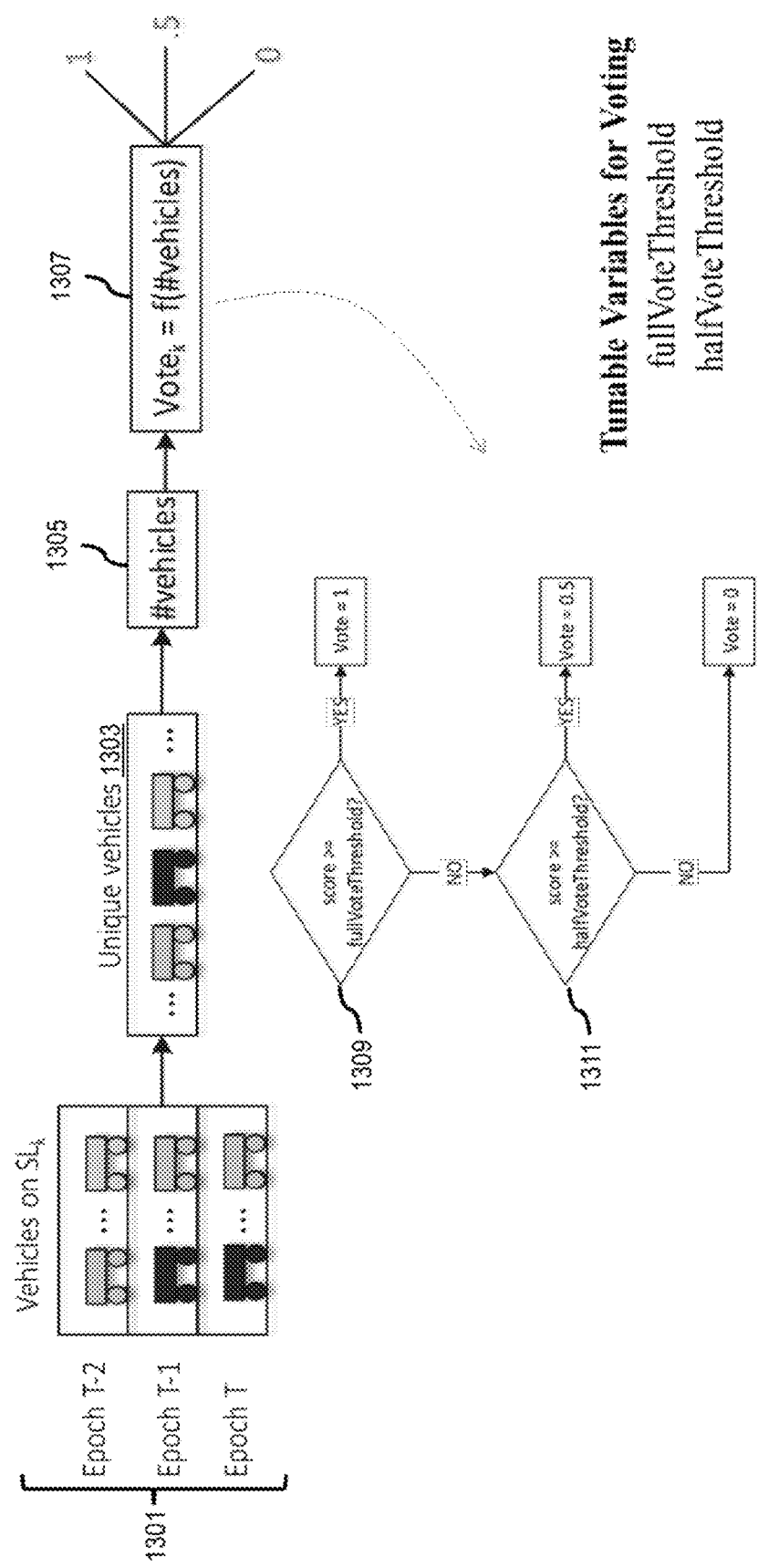
FIG. 13 is a flowchart of a process for re-opening an entire road, according to one embodiment.

In the next step, depending on the total score in this monitoring period, each superlink provides a vote towards opening the whole road. This voting process is illustrated in FIG. 13 which is a flowchart of a process for re-opening an entire road, according to one embodiment. As shown, the process is initiated by performing the time epoch-based monitoring 1301 as described above. For example, the closure monitoring module 207 selects a superlink ($SL_k$) and segments the constructed vehicle paths according to time epochs (e.g., epoch T to epoch T−2). The closure monitoring module then determines the unique vehicles 1303 contributing vehicle paths on the selected superlink $SL_k$. A count 1305 of the number of unique vehicles is also determined. For each of the counted vehicles, the closure monitoring module 207 calculates a respective traffic score for each vehicle according to the various embodiments described. As previously described, the traffic score can be used to determine the weight of the respective vehicle when voting to determine the traffic flow on a link of interest (e.g., a vote 1307 for the link/superlink as a function of the aggregate scores for the total number of vehicles 1305).

In this example, the vote can include 1 (e.g., indicating that the vehicle fully contributes to the overall total for the link and time window of interest) to 0.5 (indicating that the vehicle contribute partially) to 0 (indicating that vehicle does not contribute at all). As shown, the traffic score can be translated to a vote value associated with the vehicle using thresholds applied to the vehicle's calculated vehicle score. For example, as shown in the step 1309, if the vehicle's score is above a full vote threshold value, the vehicle will be assigned a vote value equal to 1. If not, the process proceeds to step 1311 where the closure monitoring module 207 can evaluate whether the vehicle's score is above a half vote threshold value (e.g., a threshold above 0 but below the full vote threshold). Otherwise, the vehicle is assign a vote value of 0. It is noted that the full vote threshold and half vote threshold are tunable so that different voting outcomes can be achieved (e.g., outcomes that more closely match ground truth data).

Figure 14:
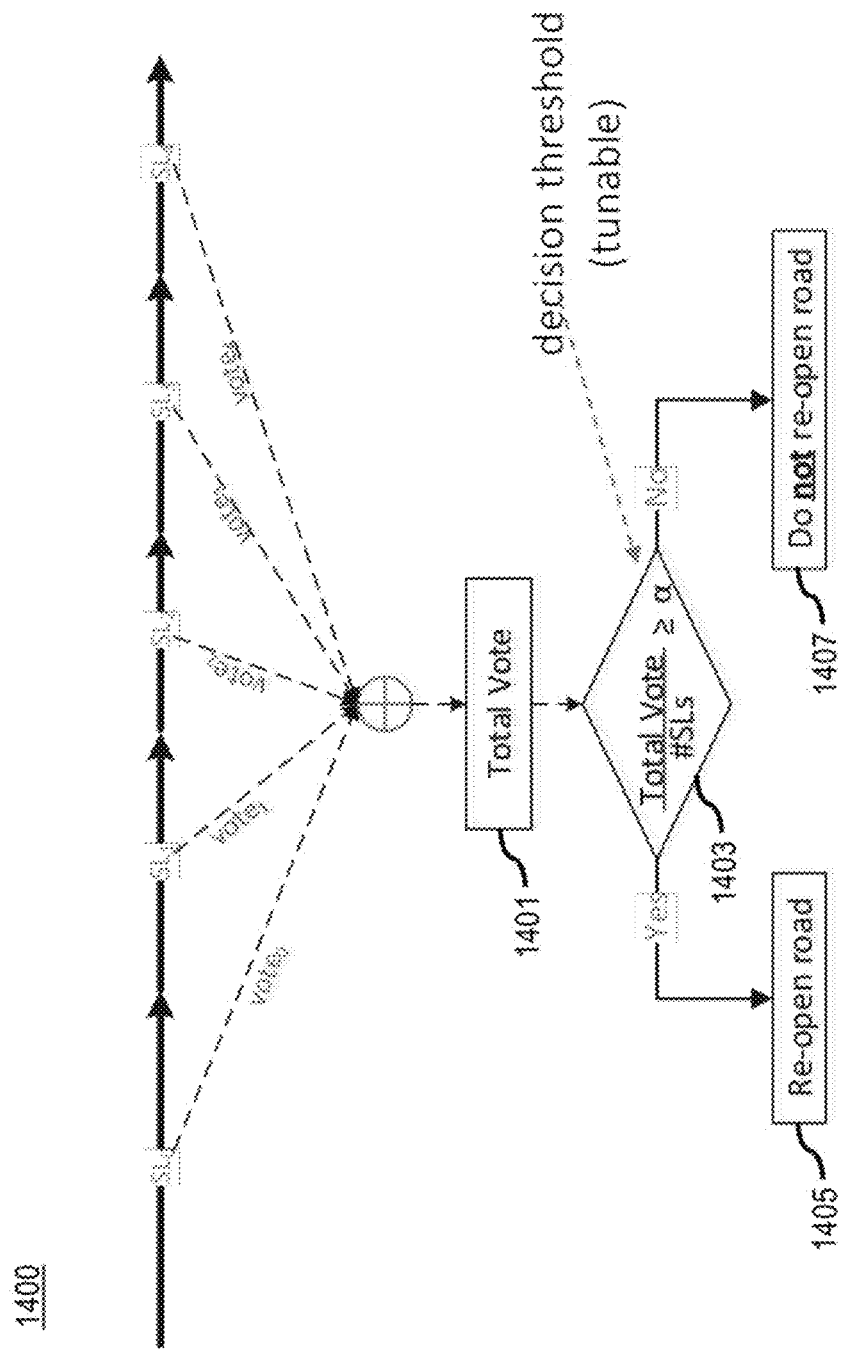
FIG. 14 is a diagram of an example voting process for re-opening an entire road, according to one embodiment.

Next, after completing the vote value assignment step, the closure monitoring module 207 determines ff total vote over all superlinks for that epoch is greater than a threshold, algorithm decides to re-open the road, as shown in the process 1400 of FIG. 14. For example, the vote counts for each of the superlinks $SL_0$-$SL_4$ are aggregated into a total vote 1401. The closure monitoring module 207 then determines if the total vote per superlink (e.g., total vote 1401/number of superlinks $SL_0$-$SL_4$). If this calculated value is greater than a decision threshold a (step 1403), then the closure monitoring module 207 can re-open the reportedly closed road (e.g., by publishing an updated closure status in the geographic database 109 or other equivalent means). Otherwise, the state of the road does not change, and the road remains closed (e.g., the closure monitoring module 207 does not re-open the road).

The closure monitoring module 207 can then optionally move on to evaluate if superlinks or links of the road shall be re-opened individually. In one embodiment, the decision mechanism to re-open individual links or superlinks of the close road is similar to the process of FIG. 13 described above. For example, as an initial step, the closure monitoring module 207 can segment the probe data and/or constructed vehicles by time into different time epochs as described above. Then, at each epoch, for each superlink, the total score of unique vehicles is calculated for the most recent time window. In one embodiment, the time window (e.g., Y minutes where Y=30) used for evaluating individual links can be different from the time window used for the entire road (e.g., X minutes where X=15 minutes).

The next step is analogous the step described above for determining the vote value for each unique vehicle, with the exception that the decision or classification is not a vote value (e.g., 0, 0.5, or 1). Instead the decision outcomes can include but are not limited to the following (e.g., outcomes 1501 of FIG. 15):

(1) Re-open the superlink.
(2) Flag the superlink: There is some traffic on superlink; however, not enough to make a high-confidence call to re-open. The superlink can be kept closed, or it can be verified manually.
(3) Do not re-open superlink.

Figure 15:
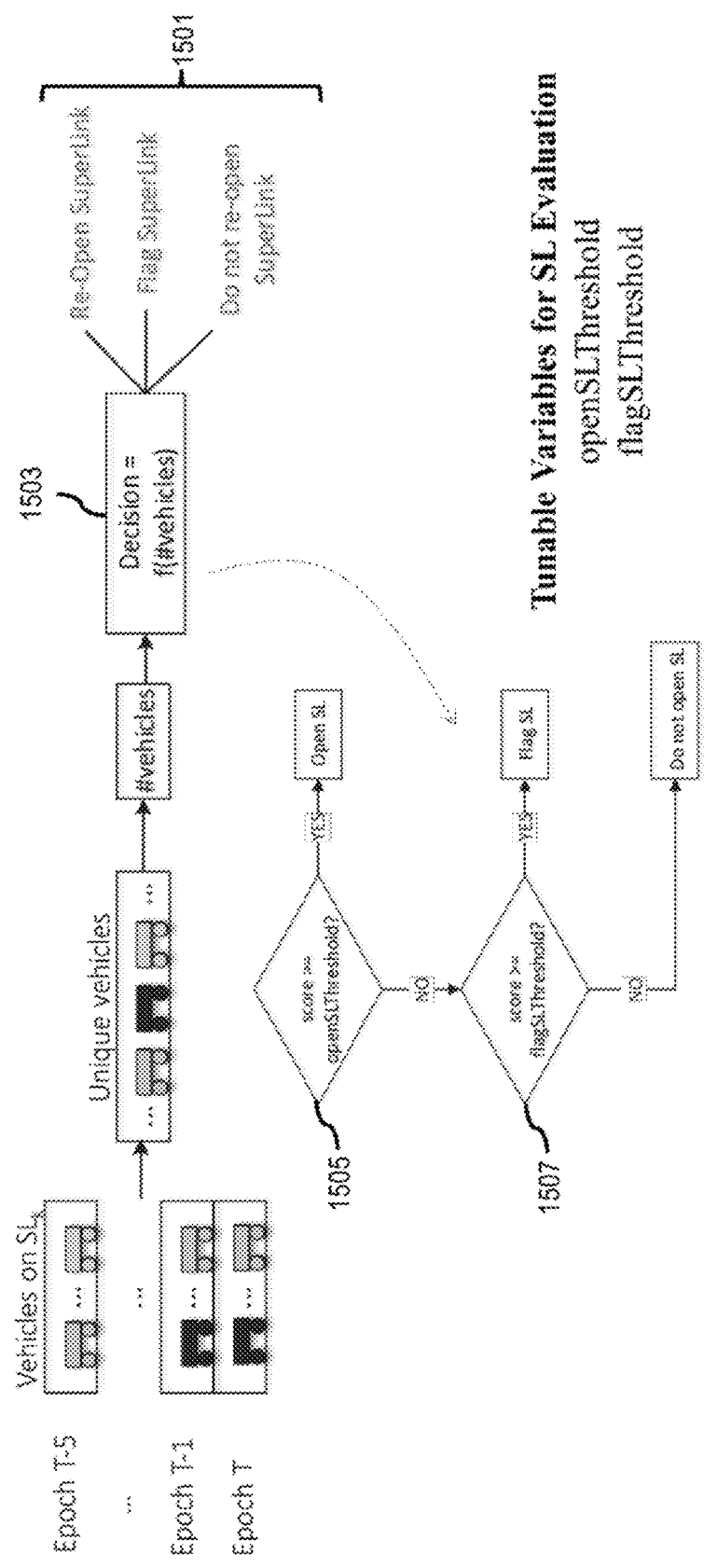
FIG. 15 is a flowchart of a process for re-opening an individual road link or superlink of a road, according to one embodiment.

As shown in FIG. 15, the closure monitoring module 207 can determine the total score all unique vehicles for a given time epoch and link/superlink (step 1503). The closure monitoring module can than apply first threshold for determining whether to open a closed link/superlink (e.g., openSLThreshold) at step 1505 to determine whether to initiate outcome 1. If the threshold of step 1505 is not met, a second threshold can be applied to determine whether to flag the link/superlink (e.g., flagSLThreshold) via outcome 2. Otherwise, outcome 3 (e.g., do not re-open) can be applied. In one embodiment, these threshold values can also be tuned to match outcome preferences or ground truth outcomes.

Returning to FIG. 1, in one embodiment, the mapping platform 111 has connectivity over a communication network 117 to other components of the system 100 including but not limited to road closure reports 101, services platform 103, services 105, content providers 107, geographic database 109, and/or vehicles 113 (e.g., probes). By way of example, the services 105 may also be other third-party services and include traffic incident services (e.g., to report road closures), mapping services, navigation services, travel planning services, notification services, social networking services, content (e.g., audio, video, images, etc.) provisioning services, application services, storage services, contextual information determination services, location-based services, information-based services (e.g., weather, news, etc.), etc. In one embodiment, the services platform 103 uses the output (e.g. physical divider predictions) of the mapping platform 111 to provide services such as navigation, mapping, other location-based services, etc.

In one embodiment, the mapping platform 111 may be a platform with multiple interconnected components. mapping platform 111 may include multiple servers, intelligent networking devices, computing devices, components and corresponding software for providing parametric representations of lane lines. In addition, it is noted that the mapping platform 111 may be a separate entity of the system 100, a part of the one or more services 105, a part of the services platform 103, or included within the vehicle 113.

In one embodiment, content providers 107a-107m (collectively referred to as content providers 107) may provide content or data (e.g., including geographic data, parametric representations of mapped features, etc.) to the geographic database 109, the mapping platform 111, the services platform 103, the services 105, and the vehicle 113. The content provided may be any type of content, such as traffic incident content (e.g., road closure reports), map content, textual content, audio content, video content, image content, etc. In one embodiment, the content providers 107 may provide content that may aid in the detecting and classifying of road closures or other traffic incidents. In one embodiment, the content providers 107 may also store content associated with the geographic database 109, mapping platform 111, services platform 103, services 105, and/or vehicle 113. In another embodiment, the content providers 107 may manage access to a central repository of data, and offer a consistent, standard interface to data, such as a repository of the geographic database 109.

In one embodiment, the vehicles 113, for instance, are part of a probe-based system for collecting probe data for detecting traffic incidents and/or measuring traffic conditions in a road network. In one embodiment, each vehicle 113 is configured to report probe data as probe points, which are individual data records collected at a point in time that records telemetry data for that point in time. In one embodiment, the probe ID can be permanent or valid for a certain period of time. In one embodiment, the probe ID is cycled, particularly for consumer-sourced data, to protect the privacy of the source.

In one embodiment, a probe point can include attributes such as: (1) probe ID, (2) longitude, (3) latitude, (4) heading, (5) speed, and (6) time. The list of attributes is provided by way of illustration and not limitation. Accordingly, it is contemplated that any combination of these attributes or other attributes may be recorded as a probe point. For example, attributes such as altitude (e.g., for flight capable vehicles or for tracking non-flight vehicles in the altitude domain), tilt, steering angle, wiper activation, etc. can be included and reported for a probe point. In one embodiment, the vehicles 113 may include sensors 115 for reporting measuring and/or reporting attributes. The attributes can also be any attribute normally collected by an on-board diagnostic (OBD) system of the vehicle, and available through an interface to the OBD system (e.g., OBD II interface or other similar interface). In one embodiment, this data allows the system 100 to calculate or construct vehicle paths of a vehicle 113 over a stretch of road (e.g., over a closure link graph).

The probe points can be reported from the vehicles 113 in real-time, in batches, continuously, or at any other frequency requested by the system 100 over, for instance, the communication network 117 for processing by the mapping platform 111. The probe points also can be mapped to specific road links stored in the geographic database 109. In one embodiment, the system 100 (e.g., via the token platform 107) can generate probe traces (e.g., vehicle paths or trajectories) from the probe points for an individual probe so that the probe traces represent a travel trajectory or vehicle path of the probe through the road network.

In one embodiment, the vehicle 113 is configured with various sensors 115 for generating or collecting vehicular sensor data, related geographic/map data, etc. In one embodiment, the sensed data represent sensor data associated with a geographic location or coordinates at which the sensor data was collected. In this way, the sensor data can act as observation data that can be separated into location-aware training and evaluation datasets according to their data collection locations as well as used for evaluating road closure reports according to the embodiments described herein. By way of example, the sensors may include a radar system, a LiDAR system, a global positioning sensor for gathering location data (e.g., GPS), a network detection sensor for detecting wireless signals or receivers for different short-range communications (e.g., Bluetooth, Wi-Fi, Li-Fi, near field communication (NFC) etc.), temporal information sensors, a camera/imaging sensor for gathering image data, an audio recorder for gathering audio data, velocity sensors mounted on steering wheels of the vehicles, switch sensors for determining whether one or more vehicle switches are engaged, and the like.

Other examples of sensors of the vehicle 113 may include light sensors, orientation sensors augmented with height sensors and acceleration sensor (e.g., an accelerometer can measure acceleration and can be used to determine orientation of the vehicle), tilt sensors to detect the degree of incline or decline of the vehicle along a path of travel, moisture sensors, pressure sensors, etc. In a further example embodiment, sensors about the perimeter of the vehicle 113 may detect the relative distance of the vehicle from a physical divider, a lane or roadway, the presence of other vehicles, pedestrians, traffic lights, potholes and any other objects, or a combination thereof. In one scenario, the sensors may detect weather data, traffic information, or a combination thereof. In one embodiment, the vehicle 113 may include GPS or other satellite-based receivers to obtain geographic coordinates from satellites for determining current location and time. Further, the location can be determined by visual odometry, triangulation systems such as A-GPS, Cell of Origin, or other location extrapolation technologies. In yet another embodiment, the sensors can determine the status of various control elements of the car, such as activation of wipers, use of a brake pedal, use of an acceleration pedal, angle of the steering wheel, activation of hazard lights, activation of head lights, etc.

In one embodiment, the communication network 117 of system 100 includes one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (Wi-Fi), wireless LAN (WLAN), Bluetooth®, Internet Protocol (IP) data casting, satellite, mobile ad-hoc network (MANET), and the like, or any combination thereof.

By way of example, the mapping platform 111, services platform 103, services 105, vehicle 113, and/or content providers 107 communicate with each other and other components of the system 100 using well known, new or still developing protocols. In this context, a protocol includes a set of rules defining how the network nodes within the communication network 117 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the OSI Reference Model.

Figure 16:
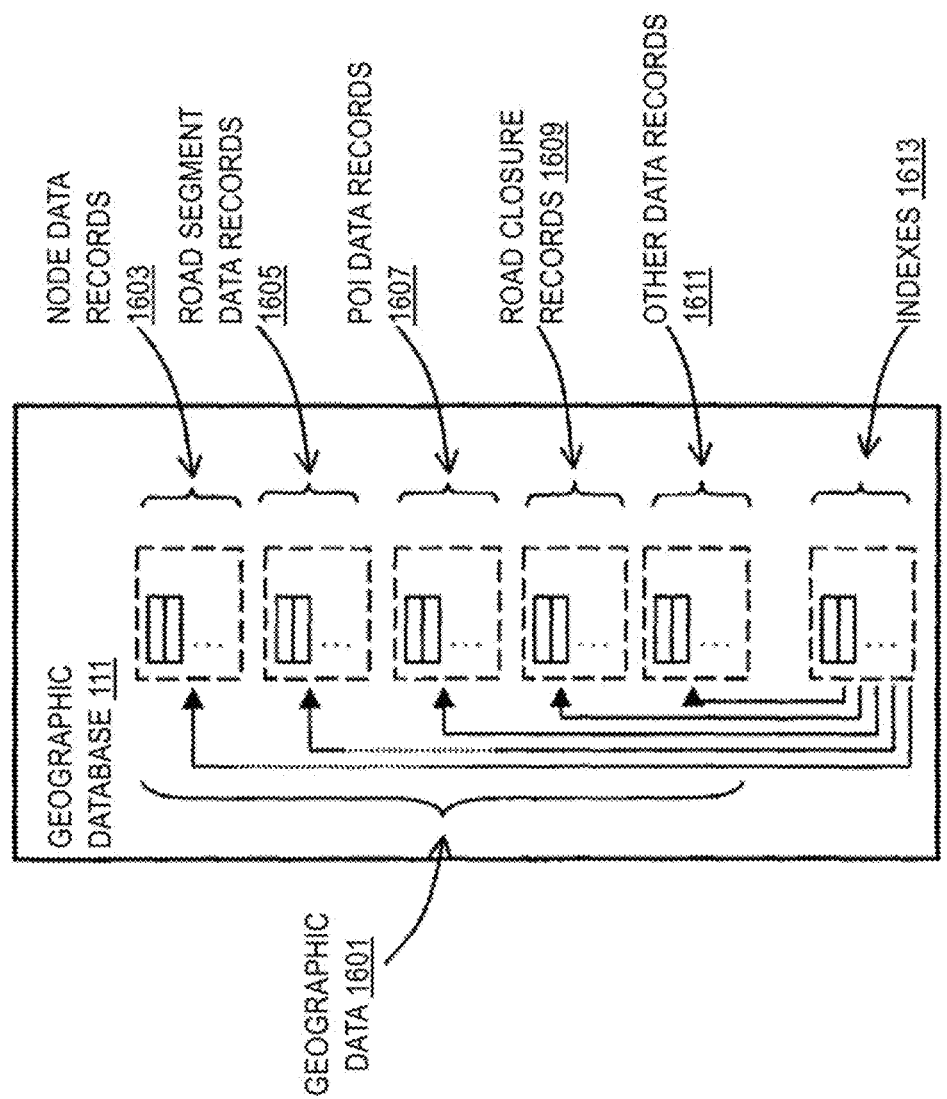
FIG. 16 is a diagram of a geographic database, according to one embodiment.

FIG. 16 is a diagram of a geographic database, according to one embodiment. In one embodiment, the geographic database 109 includes geographic data 1601 used for (or configured to be compiled to be used for) mapping and/or navigation-related services. In one embodiment, geographic features (e.g., two-dimensional or three-dimensional features) are represented using polygons (e.g., two-dimensional features) or polygon extrusions (e.g., three-dimensional features). For example, the edges of the polygons correspond to the boundaries or edges of the respective geographic feature. In the case of a building, a two-dimensional polygon can be used to represent a footprint of the building, and a three-dimensional polygon extrusion can be used to represent the three-dimensional surfaces of the building. It is contemplated that although various embodiments are discussed with respect to two-dimensional polygons, it is contemplated that the embodiments are also applicable to three-dimensional polygon extrusions. Accordingly, the terms polygons and polygon extrusions as used herein can be used interchangeably.

In one embodiment, the following terminology applies to the representation of geographic features in the geographic database 109.

"Node"—A point that terminates a link.

"Line segment"—A straight line connecting two points.

"Link" (or "edge")—A contiguous, non-branching string of one or more line segments terminating in a node at each end.

"Shape point"—A point along a link between two nodes (e.g., used to alter a shape of the link without defining new nodes).

"Oriented link"—A link that has a starting node (referred to as the "reference node") and an ending node (referred to as the "non reference node").

"Simple polygon"—An interior area of an outer boundary formed by a string of oriented links that begins and ends in one node. In one embodiment, a simple polygon does not cross itself.

"Polygon"—An area bounded by an outer boundary and none or at least one interior boundary (e.g., a hole or island). In one embodiment, a polygon is constructed from one outer simple polygon and none or at least one inner simple polygon. A polygon is simple if it just consists of one simple polygon, or complex if it has at least one inner simple polygon.

In one embodiment, the geographic database 109 follows certain conventions. For example, links do not cross themselves and do not cross each other except at a node. Also, there are no duplicated shape points, nodes, or links. Two links that connect each other have a common node. In the geographic database 109, overlapping geographic features are represented by overlapping polygons. When polygons overlap, the boundary of one polygon crosses the boundary of the other polygon. In the geographic database 109, the location at which the boundary of one polygon intersects they boundary of another polygon is represented by a node. In one embodiment, a node may be used to represent other locations along the boundary of a polygon than a location at which the boundary of the polygon intersects the boundary of another polygon. In one embodiment, a shape point is not used to represent a point at which the boundary of a polygon intersects the boundary of another polygon.

As shown, the geographic database 109 includes node data records 1603, road segment or link data records 1605, POI data records 1607, road closure data records 1609, other records 1611, and indexes 1613, for example. More, fewer or different data records can be provided. In one embodiment, additional data records (not shown) can include cartographic ("carto") data records, routing data, and maneuver data. In one embodiment, the indexes 1613 may improve the speed of data retrieval operations in the geographic database 109. In one embodiment, the indexes 1613 may be used to quickly locate data without having to search every row in the geographic database 109 every time it is accessed. For example, in one embodiment, the indexes 1613 can be a spatial index of the polygon points associated with stored feature polygons.

In exemplary embodiments, the road segment data records 1605 are links or segments representing roads, streets, or paths, as can be used in the calculated route or recorded route information for determination of one or more personalized routes. The node data records 1603 are end points corresponding to the respective links or segments of the road segment data records 1605. The road link data records 1605 and the node data records 1603 represent a road network, such as used by vehicles, cars, and/or other entities. Alternatively, the geographic database 109 can contain path segment and node data records or other data that represent pedestrian paths or areas in addition to or instead of the vehicle road record data, for example.

The road/link segments and nodes can be associated with attributes, such as geographic coordinates, street names, address ranges, speed limits, turn restrictions at intersections, and other navigation related attributes, as well as POIs, such as gasoline stations, hotels, restaurants, museums, stadiums, offices, automobile dealerships, auto repair shops, buildings, stores, parks, etc. The geographic database 109 can include data about the POIs and their respective locations in the POI data records 1607. The geographic database 109 can also include data about places, such as cities, towns, or other communities, and other geographic features, such as bodies of water, mountain ranges, etc. Such place or feature data can be part of the POI data records 1607 or can be associated with POIs or POI data records 1607 (such as a data point used for displaying or representing a position of a city).

In one embodiment, the geographic database 109 includes the road closure data records 1609 for storing predicted road closure reports, road closure evaluations, road closure link graphs, associated probe data/vehicle paths, and/or any other related data. The road closure data records 1609 comprise of the road closure data layer 119 that store the automatically generated road closure classifications generated according to the various embodiments described herein. The road closure data layer 119 can be provided to other system components or end users to provided related mapping, navigation, and/or other location-based services. In one embodiment, the road closure data records 1609 can be associated with segments of a road link (as opposed to an entire link). It is noted that the segmentation of the road for the purposes of physical divider prediction can be different than the road link structure of the geographic database 109. In other words, the segments can further subdivide the links of the geographic database 109 into smaller segments (e.g., of uniform lengths such as 5-meters). In this way, road closures or other traffic incidents can be predicted and represented at a level of granularity that is independent of the granularity or at which the actual road or road network is represented in the geographic database 109. In one embodiment, the road closure data records 1609 can be associated with one or more of the node records 1603, road segment or link records 1605, and/or POI data records 1607; or portions thereof (e.g., smaller or different segments than indicated in the road segment records 1605) to provide situational awareness to drivers and provide for safer autonomous operation of vehicles.

In one embodiment, the geographic database 109 can be maintained by the content provider 107 in association with the services platform 103 (e.g., a map developer). The map developer can collect geographic data to generate and enhance the geographic database 109. There can be different ways used by the map developer to collect data. These ways can include obtaining data from other sources, such as municipalities or respective geographic authorities. In addition, the map developer can employ field personnel to travel by vehicle along roads throughout the geographic region to observe features (e.g., road closures or other traffic incidents, etc.) and/or record information about them, for example. Also, remote sensing, such as aerial or satellite photography, can be used.

In one embodiment, the geographic database 109 include high resolution or high definition (HD) mapping data that provide centimeter-level or better accuracy of map features. For example, the geographic database 109 can be based on Light Detection and Ranging (LiDAR) or equivalent technology to collect billions of 3D points and model road surfaces and other map features down to the number lanes and their widths. In one embodiment, the HD mapping data capture and store details such as the slope and curvature of the road, lane markings, roadside objects such as sign posts, including what the signage denotes. By way of example, the HD mapping data enable highly automated vehicles to precisely localize themselves on the road, and to determine road attributes (e.g., learned speed limit values) to at high accuracy levels.

In one embodiment, the geographic database 109 is stored as a hierarchical or multilevel tile-based projection or structure. More specifically, in one embodiment, the geographic database 109 may be defined according to a normalized Mercator projection. Other projections may be used. By way of example, the map tile grid of a Mercator or similar projection is a multilevel grid. Each cell or tile in a level of the map tile grid is divisible into the same number of tiles of that same level of grid. In other words, the initial level of the map tile grid (e.g., a level at the lowest zoom level) is divisible into four cells or rectangles. Each of those cells are in turn divisible into four cells, and so on until the highest zoom or resolution level of the projection is reached.

In one embodiment, the map tile grid may be numbered in a systematic fashion to define a tile identifier (tile ID). For example, the top left tile may be numbered 00, the top right tile may be numbered 01, the bottom left tile may be numbered 10, and the bottom right tile may be numbered 11. In one embodiment, each cell is divided into four rectangles and numbered by concatenating the parent tile ID and the new tile position. A variety of numbering schemes also is possible. Any number of levels with increasingly smaller geographic areas may represent the map tile grid. Any level (n) of the map tile grid has $2(n+1)$ cells. Accordingly, any tile of the level (n) has a geographic area of $A/2(n+1)$ where A is the total geographic area of the world or the total area of the map tile grid 10. Because of the numbering system, the exact position of any tile in any level of the map tile grid or projection may be uniquely determined from the tile ID.

In one embodiment, the system 100 may identify a tile by a quadkey determined based on the tile ID of a tile of the map tile grid. The quadkey, for example, is a one-dimensional array including numerical values. In one embodiment, the quadkey may be calculated or determined by interleaving the bits of the row and column coordinates of a tile in the grid at a specific level. The interleaved bits may be converted to a predetermined base number (e.g., base 10, base 4, hexadecimal). In one example, leading zeroes are inserted or retained regardless of the level of the map tile grid in order to maintain a constant length for the one-dimensional array of the quadkey. In another example, the length of the one-dimensional array of the quadkey may indicate the corresponding level within the map tile grid 10. In one embodiment, the quadkey is an example of the hash or encoding scheme of the respective geographical coordinates of a geographical data point that can be used to identify a tile in which the geographical data point is located.

The geographic database 109 can be a master geographic database stored in a format that facilitates updating, maintenance, and development. For example, the master geographic database or data in the master geographic database can be in an Oracle spatial format or other spatial format, such as for development or production purposes. The Oracle spatial format or development/production database can be compiled into a delivery format, such as a geographic data files (GDF) format. The data in the production and/or delivery formats can be compiled or further compiled to form geographic database products or databases, which can be used in end user navigation devices or systems.

For example, geographic data is compiled (such as into a platform specification format (PSF) format) to organize and/or configure the data for performing navigation-related functions and/or services, such as route calculation, route guidance, map display, speed calculation, distance and travel time functions, and other functions, by a navigation device, such as by the vehicle 113, for example. The navigation-related functions can correspond to vehicle navigation, pedestrian navigation, or other types of navigation. The compilation to produce the end user databases can be performed by a party or entity separate from the map developer. For example, a customer of the map developer, such as a navigation device developer or other end user device developer, can perform compilation on a received geographic database in a delivery format to produce one or more compiled navigation databases.

The processes described herein for automatically evaluating road closure reports may be advantageously implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 17:
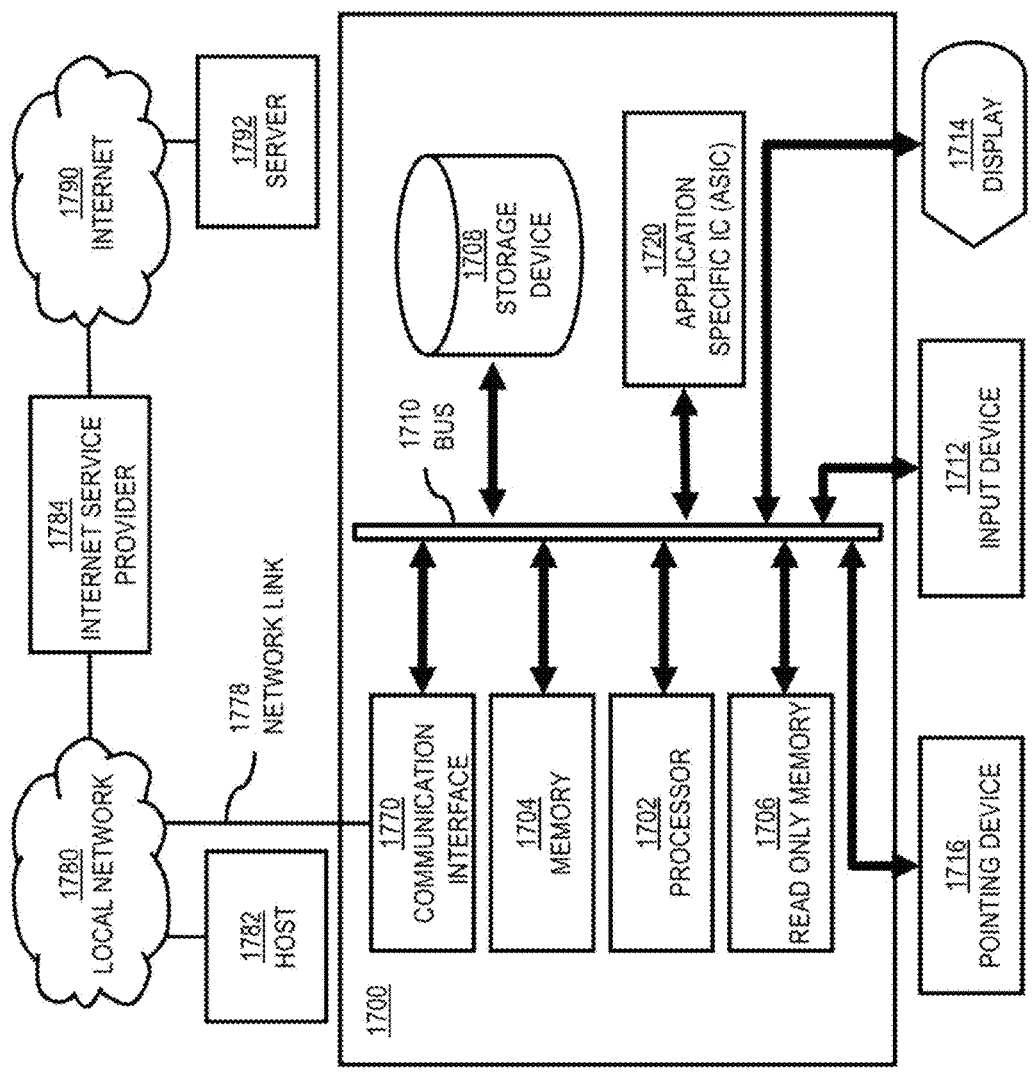
FIG. 17 is a diagram of hardware that can be used to implement an embodiment.

FIG. 17 illustrates a computer system 1700 upon which an embodiment of the invention may be implemented. Computer system 1700 is programmed (e.g., via computer program code or instructions) to automatically evaluate road closure reports as described herein and includes a communication mechanism such as a bus 1710 for passing information between other internal and external components of the computer system 1700. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range.

A bus 1710 includes one or more parallel conductors of information so that information is transferred quickly among devices coupled to the bus 1710. One or more processors 1702 for processing information are coupled with the bus 1710.

A processor 1702 performs a set of operations on information as specified by computer program code related to automatically evaluating road closure reports. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 1710 and placing information on the bus 1710. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 1702, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 1700 also includes a memory 1704 coupled to bus 1710. The memory 1704, such as a random access memory (RAM) or other dynamic storage device, stores information including processor instructions for automatically evaluating road closure reports. Dynamic memory allows information stored therein to be changed by the computer system 1700. RAM allows a unit of information stored at a location called a memory address to be stored and retrieved independently of information at neighboring addresses. The memory 1704 is also used by the processor 1702 to store temporary values during execution of processor instructions. The computer system 1700 also includes a read only memory (ROM) 1706 or other static storage device coupled to the bus 1710 for storing static information, including instructions, that is not changed by the computer system 1700. Some memory is composed of volatile storage that loses the information stored thereon when power is lost. Also coupled to bus 1710 is a non-volatile (persistent) storage device 1708, such as a magnetic disk, optical disk or flash card, for storing information, including instructions, that persists even when the computer system 1700 is turned off or otherwise loses power.

Information, including instructions for automatically evaluating road closure reports, is provided to the bus 1710 for use by the processor from an external input device 1712, such as a keyboard containing alphanumeric keys operated by a human user, or a sensor. A sensor detects conditions in its vicinity and transforms those detections into physical expression compatible with the measurable phenomenon used to represent information in computer system 1700. Other external devices coupled to bus 1710, used primarily for interacting with humans, include a display device 1714, such as a cathode ray tube (CRT) or a liquid crystal display (LCD), or plasma screen or printer for presenting text or images, and a pointing device 1716, such as a mouse or a trackball or cursor direction keys, or motion sensor, for controlling a position of a small cursor image presented on the display 1714 and issuing commands associated with graphical elements presented on the display 1714. In some embodiments, for example, in embodiments in which the computer system 1700 performs all functions automatically without human input, one or more of external input device 1712, display device 1714 and pointing device 1716 is omitted.

In the illustrated embodiment, special purpose hardware, such as an application specific integrated circuit (ASIC) 1720, is coupled to bus 1710. The special purpose hardware is configured to perform operations not performed by processor 1702 quickly enough for special purposes. Examples of application specific ICs include graphics accelerator cards for generating images for display 1714, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 1700 also includes one or more instances of a communications interface 1770 coupled to bus 1710. Communication interface 1770 provides a one-way or two-way communication coupling to a variety of external devices that operate with their own processors, such as printers, scanners and external disks. In general, the coupling is with a network link 1778 that is connected to a local network 1780 to which a variety of external devices with their own processors are connected. For example, communication interface 1770 may be a parallel port or a serial port or a universal serial bus (USB) port on a personal computer. In some embodiments, communications interface 1770 is an integrated services digital network (ISDN) card or a digital subscriber line (DSL) card or a telephone modem that provides an information communication connection to a corresponding type of telephone line. In some embodiments, a communication interface 1770 is a cable modem that converts signals on bus 1710 into signals for a communication connection over a coaxial cable or into optical signals for a communication connection over a fiber optic cable. As another example, communications interface 1770 may be a local area network (LAN) card to provide a data communication connection to a compatible LAN, such as Ethernet. Wireless links may also be implemented. For wireless links, the communications interface 1770 sends or receives or both sends and receives electrical, acoustic or electromagnetic signals, including infrared and optical signals, that carry information streams, such as digital data. For example, in wireless handheld devices, such as mobile telephones like cell phones, the communications interface 1770 includes a radio band electromagnetic transmitter and receiver called a radio transceiver. In certain embodiments, the communications interface 1770 enables connection to the communication network 117 for automatically evaluating road closure reports.

The term computer-readable medium is used herein to refer to any medium that participates in providing information to processor 1702, including instructions for execution. Such a medium may take many forms, including, but not limited to, non-volatile media, volatile media and transmission media. Non-volatile media include, for example, optical or magnetic disks, such as storage device 1708. Volatile media include, for example, dynamic memory 1704. Transmission media include, for example, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, any other memory chip or cartridge, a carrier wave, or any other medium from which a computer can read.

FIG. 18 illustrates a chip set 1800 upon which an embodiment of the invention may be implemented. Chip set 1800 is programmed to automatically evaluate road closure reports as described herein and includes, for instance, the processor and memory components described with respect to FIG. 17 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set can be implemented in a single chip.

In one embodiment, the chip set 1800 includes a communication mechanism such as a bus 1801 for passing information among the components of the chip set 1800. A processor 1803 has connectivity to the bus 1801 to execute instructions and process information stored in, for example, a memory 1805. The processor 1803 may include one or more processing cores with each core configured to perform independently. A multi-core processor enables multiprocessing within a single physical package. Examples of a multi-core processor include two, four, eight, or greater numbers of processing cores. Alternatively or in addition, the processor 1803 may include one or more microprocessors configured in tandem via the bus 1801 to enable independent execution of instructions, pipelining, and multithreading. The processor 1803 may also be accompanied with one or more specialized components to perform certain processing functions and tasks such as one or more digital signal processors (DSP) 1807, or one or more application-specific integrated circuits (ASIC) 1809. A DSP 1807 typically is configured to process real-world signals (e.g., sound) in real time independently of the processor 1803. Similarly, an ASIC 1809 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The processor 1803 and accompanying components have connectivity to the memory 1805 via the bus 1801. The memory 1805 includes both dynamic memory (e.g., RAM, magnetic disk, writable optical disk, etc.) and static memory (e.g., ROM, CD-ROM, etc.) for storing executable instructions that when executed perform the inventive steps described herein to automatically evaluate road closure reports. The memory 1805 also stores the data associated with or generated by the execution of the inventive steps.

Figure 19:
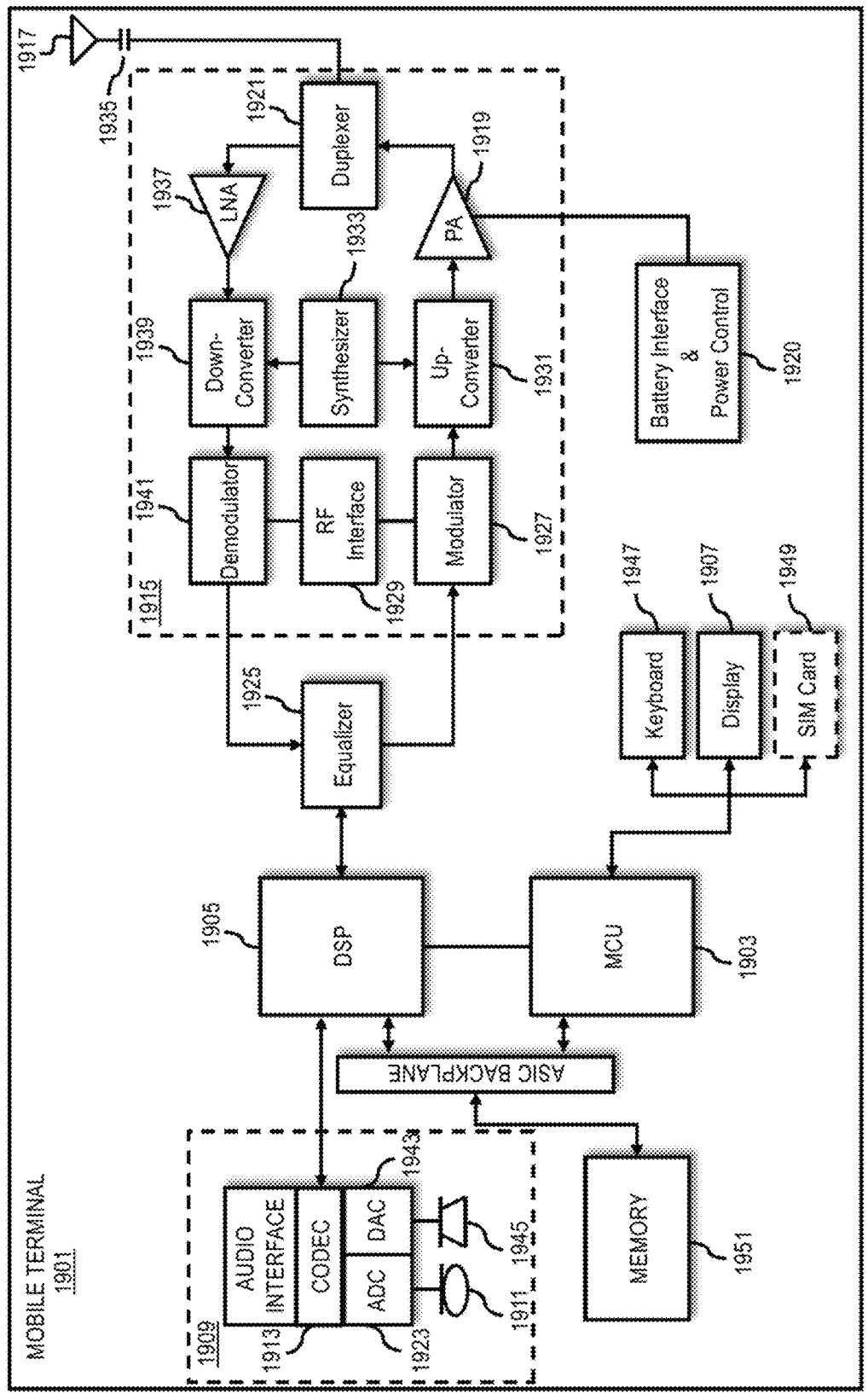
FIG. 19 is a diagram of a mobile terminal (e.g., handset or vehicle or part thereof) that can be used to implement an embodiment.

FIG. 19 is a diagram of exemplary components of a mobile terminal (e.g., handset) capable of operating in the system of FIG. 1, according to one embodiment. Generally, a radio receiver is often defined in terms of front-end and back-end characteristics. The front-end of the receiver encompasses all of the Radio Frequency (RF) circuitry whereas the back-end encompasses all of the base-band processing circuitry. Pertinent internal components of the telephone include a Main Control Unit (MCU) 1903, a Digital Signal Processor (DSP) 1905, and a receiver/transmitter unit including a microphone gain control unit and a speaker gain control unit. A main display unit 1907 provides a display to the user in support of various applications and mobile station functions that offer automatic contact matching. An audio function circuitry 1909 includes a microphone 1911 and microphone amplifier that amplifies the speech signal output from the microphone 1911. The amplified speech signal output from the microphone 1911 is fed to a coder/decoder (CODEC) 1913.

A radio section 1915 amplifies power and converts frequency in order to communicate with a base station, which is included in a mobile communication system, via antenna 1917. The power amplifier (PA) 1919 and the transmitter/modulation circuitry are operationally responsive to the MCU 1903, with an output from the PA 1919 coupled to the duplexer 1921 or circulator or antenna switch, as known in the art. The PA 1919 also couples to a battery interface and power control unit 1920.

In use, a user of mobile station 1901 speaks into the microphone 1911 and his or her voice along with any detected background noise is converted into an analog voltage. The analog voltage is then converted into a digital signal through the Analog to Digital Converter (ADC) 1923. The control unit 1903 routes the digital signal into the DSP 1905 for processing therein, such as speech encoding, channel encoding, encrypting, and interleaving. In one embodiment, the processed voice signals are encoded, by units not separately shown, using a cellular transmission protocol such as global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wireless fidelity (WiFi), satellite, and the like.

The encoded signals are then routed to an equalizer 1925 for compensation of any frequency-dependent impairments that occur during transmission though the air such as phase and amplitude distortion. After equalizing the bit stream, the modulator 1927 combines the signal with a RF signal generated in the RF interface 1929. The modulator 1927 generates a sine wave by way of frequency or phase modulation. In order to prepare the signal for transmission, an up-converter 1931 combines the sine wave output from the modulator 1927 with another sine wave generated by a synthesizer 1933 to achieve the desired frequency of transmission. The signal is then sent through a PA 1919 to increase the signal to an appropriate power level. In practical systems, the PA 1919 acts as a variable gain amplifier whose gain is controlled by the DSP 1905 from information received from a network base station. The signal is then filtered within the duplexer 1921 and optionally sent to an antenna coupler 1935 to match impedances to provide maximum power transfer. Finally, the signal is transmitted via antenna 1917 to a local base station. An automatic gain control (AGC) can be supplied to control the gain of the final stages of the receiver. The signals may be forwarded from there to a remote telephone which may be another cellular telephone, other mobile phone or a land-line connected to a Public Switched Telephone Network (PSTN), or other telephony networks.

Voice signals transmitted to the mobile station 1901 are received via antenna 1917 and immediately amplified by a low noise amplifier (LNA) 1937. A down-converter 1939 lowers the carrier frequency while the demodulator 1941 strips away the RF leaving only a digital bit stream. The signal then goes through the equalizer 1925 and is processed by the DSP 1905. A Digital to Analog Converter (DAC) 1943 converts the signal and the resulting output is transmitted to the user through the speaker 1945, all under control of a Main Control Unit (MCU) 1903—which can be implemented as a Central Processing Unit (CPU) (not shown).

The MCU 1903 receives various signals including input signals from the keyboard 1947. The keyboard 1947 and/or the MCU 1903 in combination with other user input components (e.g., the microphone 1911) comprise a user interface circuitry for managing user input. The MCU 1903 runs a user interface software to facilitate user control of at least some functions of the mobile station 1901 to automatically evaluate road closure reports. The MCU 1903 also delivers a display command and a switch command to the display 1907 and to the speech output switching controller, respectively. Further, the MCU 1903 exchanges information with the DSP 1905 and can access an optionally incorporated SIM card 1949 and a memory 1951. In addition, the MCU 1903 executes various control functions required of the station. The DSP 1905 may, depending upon the implementation, perform any of a variety of conventional digital processing functions on the voice signals. Additionally, DSP 1905 determines the background noise level of the local environment from the signals detected by microphone 1911 and sets the gain of microphone 1911 to a level selected to compensate for the natural tendency of the user of the mobile station 1901.

The CODEC 1913 includes the ADC 1923 and DAC 1943. The memory 1951 stores various data including call incoming tone data and is capable of storing other data including music data received via, e.g., the global Internet. The software module could reside in RAM memory, flash memory, registers, or any other form of writable computer-readable storage medium known in the art including non-transitory computer-readable storage medium. For example, the memory device 1951 may be, but not limited to, a single memory, CD, DVD, ROM, RAM, EEPROM, optical storage, or any other non-volatile or non-transitory storage medium capable of storing digital data.

An optionally incorporated SIM card 1949 carries, for instance, important information, such as the cellular phone number, the carrier supplying service, subscription details, and security information. The SIM card 1949 serves primarily to identify the mobile station 1901 on a radio network. The card 1949 also contains a memory for storing a personal telephone number registry, text messages, and user specific mobile station settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A computer-implemented method for automatically evaluating a road closure report comprising:
    processing, by a processor, the road closure report to determine one or more road links that are associated with a road closure;
    constructing, by a processor, a closure link graph comprising the one or more road links, one or more upstream road links relative to the one or more road links, and one or more downstream road links relative to the one or more road links, wherein the one or more upstream road links and the one or more downstream road links are open for travel;
    collecting, by a processor, probe data from one or more sensors of one or more vehicles traveling on a plurality of roadways corresponding to the closure link graph;
    processing, by a processor, the probe data to calculate one or more vehicle paths traversing the closure link graph; and
    classifying, by a processor, a closure status of the one or more road links based on the one or more vehicle paths.

2. The method of claim 1, wherein the classified closure status is used to override the road closure of the road closure report for at least one of the one or more road links.

3. The method of claim 1, further comprising:
    selecting a road link from among the one or more road links to designate as a current link;
    determining an in link from among the one or more upstream road links that are upstream from the current link;
    determining an out link from among the one or more downstream road links that are downstream from the current link; and
    calculating a traffic score for the current link based on the one or more vehicle paths that traverse the in link, the current link, the out link, or a combination thereof.

4. The method of claim 3, wherein each of the one or more road links is iteratively selected as the current link to calculate the traffic score for the one or more road links as an aggregate.

5. The method of claim 3, further comprising:
    selecting a vehicle path from among the one or more vehicle paths; and
    determining a presence or an absence of one or more probe points of the selected vehicle path on the in link, the current link, the out link, or a combination thereof, wherein the traffic score is further based on the presence or the absence of the one or more probe points.

6. The method of claim 5, wherein the one or more probe points are map matched to the in link, the current link, the out link, or a combination thereof from among one or more candidate links, the method comprising:
    determining a map matching prominence of the in link, the current link, the out link, or a combination thereof with respect to the one or more candidate links, wherein the map matching prominence indicates a potential level of map matching error; and
wherein the traffic score is further based on the map matching prominence.

7. The method of claim 5, wherein the traffic score is reduced based on determining that none of the one or more probe points are present on the current link.

8. The method of claim 3, further comprising:
determining that there is at least one alternate path between the in link, the current link, the out link, or a combination thereof; and
adjusting the traffic score based on the at least one alternate path.

9. The method of claim 8, wherein the adjusting of the traffic score comprises reducing the traffic score based on a number of the at least one alternate path that has been detected.

10. The method of claim 9, wherein the at least one alternate path enables a corresponding vehicle to bypass the current link as the vehicle travels from the in link to the out link.

11. The method of claim 1, further comprising:
aggregating the one or more road links into one or more superlinks, wherein the one or more superlinks consist of an ordered set of the one or more road links such that a vehicle traveling through one road link of the one or more superlinks also travels through all other road links of the one or more superlinks,
wherein the closure status is determined with respect to the one or more superlinks.

12. The method of claim 3, wherein the traffic score is calculated for a most current set of one or more time epochs of the probe data, and wherein the closure status is classified based on the most current set of the one or more time epochs.

13. The method of claim 12, wherein the one or more road links are part of a road segment for which the road closure is reported, and wherein the traffic score calculated from each of the one or more road links is used to determine a respective weight of said each of the one or more road links for characterizing the closure status for an entirety of the road segment.

14. The method of claim 13, wherein the respective weight of said each of the one or more road links is further based on a number of the one or more vehicle paths or corresponding vehicles on said each of the one or more road links.

15. An apparatus for automatically evaluating a road closure report comprising:
at least one processor; and
at least one memory including computer program code for one or more programs,
the at least one memory and the computer program code configured to, with the at least one processor, cause the apparatus to perform at least the following,
construct a closure link graph comprising one or more road links that are associated with the road closure report, one or more upstream road links relative to the one or more road links, and one or more downstream road links relative to the one or more road links;
collect probe data from one or more sensors of one or more vehicles traveling on a plurality of roadways corresponding to the closure link graph;
process the probe data to calculate one or more vehicle paths traversing the closure link graph; and
classify a closure status of the one or more road links based on the one or more vehicle paths.

16. The apparatus of claim 15, wherein the apparatus is further caused to:
select a road link from among the one or more road links to designate as a current link;
determine an in link from among the one or more upstream road links that are upstream from the current link;
determine an out link from among the one or more downstream road links that is downstream from the current link; and
calculate a traffic score for the current link based on the one or more vehicle paths that traverse the in link, the current link, the out link, or a combination thereof.

17. The apparatus of claim 15, wherein the apparatus is further caused to perform:
selecting a vehicle path from among the one or more vehicle paths; and
determining a presence or an absence of one or more probe points of the selected vehicle path on the in link, the current link, the out link, or a combination thereof,
wherein the traffic score is further based on the presence or the absence of the one or more probe points.

18. A non-transitory computer-readable storage medium for automatically evaluating a road closure report, carrying one or more sequences of one or more instructions which, when executed by one or more processors, cause an apparatus to perform:
constructing a closure link graph comprising one or more road links that are associated with the road closure report, one or more upstream road links relative to the one or more road links, and one or more downstream road links relative to the one or more road links;
collecting probe data from one or more sensors of one or more vehicles traveling on a plurality of roadways corresponding to the closure link graph;
processing the probe data to calculate one or more vehicle paths traversing the closure link graph; and
classifying a closure status of the one or more road links based on the one or more vehicle paths.

19. The non-transitory computer-readable storage medium of claim 18, wherein the apparatus is further caused to perform:
selecting a road link from among the one or more road links to designate as a current link;
determining an in link from among the one or more upstream road links that are upstream from the current link;
determining an out link from among the one or more downstream road links that are downstream from the current link; and
calculating a traffic score for the current link based on the one or more vehicle paths that traverse the in link, the current link, the out link, or a combination thereof.

20. The non-transitory computer-readable storage medium of claim 18, wherein the apparatus is further caused to perform:
selecting a vehicle path from among the one or more vehicle paths; and
determining a presence or an absence of one or more probe points of the selected vehicle path on the in link, the current link, the out link, or a combination thereof,
wherein the traffic score is further based on the presence or the absence of the one or more probe points.

* * * * *